United States Patent
Collomosse et al.

(10) Patent No.: US 12,505,565 B2
(45) Date of Patent: Dec. 23, 2025

(54) IDENTIFYING AND LOCALIZING EDITORIAL CHANGES TO IMAGES UTILIZING DEEP LEARNING

(71) Applicants: Adobe Inc., San Jose, CA (US); University of Surrey, Guildford (GB)

(72) Inventors: John Collomosse, Woking (GB); Alexander Black, London (GB); Van Tu Bui, Guildford (GB); Hailin Jin, San Jose, CA (US); Viswanathan Swaminathan, Saratoga, CA (US)

(73) Assignees: Adobe Inc., San Jose, CA (US); University of Surrey, Guildford (GB)

( * ) Notice: Subject to any disclaimer, the term of this patent is extended or adjusted under 35 U.S.C. 154(b) by 796 days.

(21) Appl. No.: 17/804,376

(22) Filed: May 27, 2022

(65) Prior Publication Data

US 2023/0386054 A1 Nov. 30, 2023

(51) Int. Cl.
*G06T 7/33* (2017.01)
*G06N 3/04* (2023.01)
*G06T 3/18* (2024.01)

(52) U.S. Cl.
CPC ............... *G06T 7/337* (2017.01); *G06N 3/04* (2013.01); *G06T 3/18* (2024.01); *G06T 2207/20084* (2013.01); *G06T 2207/20221* (2013.01)

(58) Field of Classification Search
CPC . G06T 7/337; G06T 3/18; G06T 2207/20084; G06T 2207/20221; G06N 3/04
See application file for complete search history.

(56) References Cited

U.S. PATENT DOCUMENTS 11,601,442 B2    3/2023  Sekar et al.
2022/0027732 A1*  1/2022  Arslan ................ G06V 10/761
(Continued)

FOREIGN PATENT DOCUMENTS

| CA | 3034323 A1 | 3/2018 |
| CN | 112966127 B | 5/2022 |
| WO | 2022005653 A1 | 1/2022 |

OTHER PUBLICATIONS

Wang, Junke, et al. "Objectformer for image manipulation detection and localization." Proceedings of the IEEE/CVF Conference on Computer Vision and Pattern Recognition. Mar. 29, 2022. (Year: 2022).*

(Continued)

*Primary Examiner* — David Perlman
(74) *Attorney, Agent, or Firm* — Keller Preece PLLC

(57) ABSTRACT

The present disclosure relates to systems, methods, and non-transitory computer readable media that utilize deep learning to identify regions of an image that have been editorially modified. For example, the image comparison system includes a deep image comparator model that compares a pair of images and localizes regions that have been editorially manipulated relative to an original or trusted image. More specifically, the deep image comparator model generates and surfaces visual indications of the location of such editorial changes on the modified image. The deep image comparator model is robust and ignores discrepancies due to benign image transformations that commonly occur during electronic image distribution. The image comparison system optionally includes an image retrieval model utilizes a visual search embedding that is robust to minor manipulations or benign modifications of images. The image retrieval model utilizes a visual search embedding for an image to robustly identify near duplicate images.

20 Claims, 14 Drawing Sheets

(56) References Cited

U.S. PATENT DOCUMENTS

| | | | |
|---|---|---|---|
| 2022/0215205 A1 | 7/2022 | Swaminathan et al. | |
| 2023/0306721 A1 | 9/2023 | Karlinsky et al. | |
| 2024/0273852 A1* | 8/2024 | Dong | G06V 10/761 |

OTHER PUBLICATIONS

U.S. Appl. No. 17/573,041, Sep. 26, 2024, Notice of Allowance.
Andrew Rouditchenko et al., "Self-Supervised Audio-Visual Co-Segmentation"; 978-1-5386-4658-8/18, © 2019 IEEE (Year: 2019).
Sepehr Valipour et al., "Recurrent Fully Convolutional Networks for Video Segmentation": arXiv: 1606.00487v3 [cs.CV] Oct. 31, 2016 (Year: 2016).
U.S. Appl. No. 17/822,573, Apr. 19, 2024, Notice of Allowance.
T. Bertin-Mahieux, D. P. Ellis, B. Whitman, and P. Lamere. 2011. The million song dataset. In Proc. Intl. Conf of Soceity for Music Information Retrieval. 591-596.
A. Bharati, D. Moreira, P.J. Flynn, A. de Rezende Rocha, K.W. Bowyer, and W.J. Scheirer. 2021. Transformation-Aware Embeddings for Image Provenance. IEEE Trans. Info. Forensics and Sec. 16 (2021), 2493-2507.
A. Black, T. Bui, H. Jin, V. Swaminathan, and J. Collomosse. 2021. Deep Image Comparator: Learning To Visualize Editorial Change. In Proceedings of the IEEE/CVF Conference on Computer Vision and Pattern Recognition (CVPR)Workshops. 972-980.
D. Brian, H. Russ, P. Ben, B. Nicole, and F. C. Canton. 2019. The deepfake detection challenge (dfdc) preview dataset. arXiv preprint arXiv:1910.08854 (2019).
T. Bui, D. Cooper, J. Collomosse, M. Bell, A. Green, J. Sheridan, J. Higgins, A. Das, J. Keller, and O. Thereaux. 2020. Tamper-proofing Video with Hierarchical Attention Autoencoder Hashing on Blockchain. IEEE Trans. Multimedia (TMM) 22, 11 (2020), 2858-2872. https://doi.org/10.1109/TMM.2020.2967640.
H. Chen, W. Xie, A. Vedaldi, and A. Zisserman. 2020b. VGG-Sound: A large scale audio-visual dataset. In Proc. Intl. Conf. on Acoustics, Speech and Signal Processing (ICASSP).
K. Choi, G. Fazekas, K. Cho, and M. Sandler. 2018. A Tutorial on Deep Learning for Music Information Retrieval. arXiv:1709.04396v2 (2018).
K. Choi, G. Fazekas, M. Sandler, and K. Cho. 2017. Convolutional recurrent neural networks for music classification. In Proc. Intl. Conf. on Acoustics, Speech and Signal Processing (ICASSP).
Coalition for Content Provenance and Authenticity. 2021. Draft Technical Specification 0.7. Technical Report. C2PA. https://c2pa.org/public-draft/.
S. Dieleman and B. Schrauwen. 2014. End-to-end learning for music audio. In Proc. Intl. Conf. on Acoustics, Speech and Signal Processing (ICASSP).
M. Douze, G. Tolias, E. Pizzi, Z. Papakipos, L. Chanussot, F. Radenovic, T. Jenicek, M. Maximov, L. Leal-Taixé, I. Elezi, O. Chum, and C. C. Ferrer. 2021. The 2021 Image Similarity Dataset and Challenge. CoRR abs/2106.09672 (2021). arXiv:2106.09672 http://arxiv.org/abs/2106.09672.
J. S. Downie. 2003. Music Information Retrieval. Annual review of information science and technology 37, 1 (2003), 295-340.
S. Gregory. 2019. Ticks or it didn't happen. Technical Report. Witness.org.
T. Grill and J. Schluter. 2015. Music boundary detection using neural networks on spectrograms and self-similarity lag matrices. In Proc. EUSPICO.
K. Hameed, A. Mumtax, and S. Gilani. 2006. Digital imageWatermarking in the wavelet transform domain. WASET 13 (2006), 86-89.
Y. Han, J. Kim, and K. Lee. 2017. Deep convolutional neural networks for predominant instrument recognition in polyphonic music. IEEE Trans. Audio, Speech and Language Processing 25, 1 (2017), 208-221.
E. J. Humphrey and J. P. Bello. 2012. Rethinking automatic chord recognition with convolutional neural networks. In Proc. Intl. Conf. on Machine Learning and Applications.
C. Jacobs, A. Finkelstein, and D. Salesin. 1995. Fast multiresolution image querying. In Proc. ACM SIGGRAPH. ACM, 277-286.
Q-Y. Jiang and W-J. Li. 2018. Asymmetric Deep Supervised Hashing. In AAAI.
Karen Sparck Jones. 1972. A statistical interpretation of term specificity and its application in retrieval. Journal of documentation (1972).
H. Lee, P. Pham, Y. Largman, and A. Y. Ng. 2009. Unsupervised feature learning for audio classification using convolutional deep belief networks. In Proc. Advances in Neural Information Processing Systems (NIPS).
J. Lee, J. Park, K. L. Kim, and J. Nam. 2017. Sample-level deep convolutional neural networks for music auto-tagging using raw waveforms. arXiv preprint arXiv:1703.01789 (2017).
Vladimir I Levenshtein et al. 1966. Binary codes capable of correcting deletions, insertions, and reversals. In Soviet physics doklady, vol. 10. Soviet Union, 707-710.
W. Li, S. Wang, and W-C. Kang. 2016. Feature learning based deep supervised hashing with pairwise labels. In Proc. IJCAI. 1711-1717.
Y. Li, W. Pei, and J. van Gemert. 2019. Push for Quantization: Deep Fisher Hashing. BMVC (2019).
R. Lu, K. Wu, Z. Duan, and C. Zhang. 2017. Deep ranking: triplet matchnet for music metric learning. In Proc. Intl. Conf. on Acoustics, Speech and Signal Processing (ICASSP).
D. Moreira, A. Bharati, J. Brogan, A. Pinto, M. Parowski, K.W. Bowyer, P.J. Flynn, A. Rocha, and W.J. Scheirer. 2018. Image provenance analysis at scale. IEEE Trans. Image Proc. 27, 12 (2018), 6109-6122.
E. Nguyen, T. Bui, V. Swaminathan, and J. Collomosse. 2021. OSCAR-Net: Objectcentric Scene Graph Attention for Image Attribution. In Proc. ICCV.
T. Pan. 2019. Digital-Content-Based Identification: Similarity hashing for content identification in decentralized environments. In Proc. Blockchain for Science.
F. Rigaud and M. Radenen. 2016. Singing voice melody transcription using deep neural networks. In Proc. Intl. Conf. on Music Information Retreival (ISMIR).
L. Rosenthol, A. Parsons, E. Scouten, J. Aythora, B. MacCormack, P. England, M. Levallee, J. Dotan, et al. 2020. Content Authenticity Initiative (CAI): Setting the Standard for Content Attribution. Technical Report. Adobe Inc.
J. Schluter and S. Bock. 2013. Musical onset detection with convolutional neural networks. In Proc. Intl. Workshop on Machine Learning and Music (MML).
H. Shawn, C. Sourish, E. Daniel Pw, G. Jort F, J. Aren, M. R. Channing, P. Manoj, P. Devin, S. Rif A, S. Bryan, et al. 2017. CNN architectures for large-scale audio classification. In Proc. Intl. Conf. on Acoustics, Speech and Signal Processing (ICASSP). IEEE, 131-135.
S. Sigtia, E. Benetos, and S. Dixon. 2015. An end-to-end neural network for polyphonic music transcription. arXiv preprint arXiv:1508.01774 (2015).
S. Su, C. Zhang, K. Han, and Y. Tian. 2018. Greedy hash: Towards fast optimization for accurate hash coding in CNN. In Proc. NeurIPS. 798-807.
G. Tzanetakis and P. Cook. 2002. Musical genre classification of audio signals. IEEE Trans. on Audio and Speech Proc. (2002).
L.-C. Yang, S.-Y. Chou, J.-Y. Liu, Y.-H. Yang, and Y.-A. Chen. 2017. Revisiting the problem of audio-based hit song prediction using convolutional neural networks. arXiv preprint arXiv:1704.01280 (2017).
N. Yu, V. Skripniuk, S.r Abdelnabi, and M. Fritz. 2021. Artificial Fingerprinting for Generative Models: Rooting Deepfake Attribution in Training Data. In Proc. Intl. Conf. Computer Vision (ICCV).
X. Zhang, Z. H. Sun, S. Karaman, and S.F. Chang. 2020. Discovering Image Manipulation History by Pairwise Relation and Forensics Tools. IEEE J. Selected Topics in Signal Processing. 14, 5 (2020), 1012-1023.
F. Zheng, G. Zhang, and Z. Song. 2001. Deep convolutional neural networks for predominant instrument recognition in polyphonic music. J. Computer Science and Technology 16, 6 (2001), 582-589.
A. Ilyas, L. Engstrom, A. Athalye, and J. Lin. Black-box adversarial attacks with limited queries and information. In ICML, 2018.

(56) References Cited

OTHER PUBLICATIONS

Aleksander Madry, Aleksandar Makelov, Ludwig Schmidt, Dimitris Tsipras, and Adrian Vladu. Towards deep learning models resistant to adversarial attacks. In ICLR, 2018.

Alex Tamkin, Mike Wu, and Noah Goodman. Viewmaker networks: Learning views for unsupervised representation learning. In ICLR, 2021. URL https://openreview.net/forum?id=enoVQWLsfyL.

Alexey Kurakin, Ian Goodfellow, and Samy Bengio. Adversarial examples in the physical world. arXiv preprint arXiv:1607.02533, 2016.

Anish Athalye and Ilya Sutskever. Synthesizing robust adversarial examples. arXiv preprint arXiv:1707.07397, 2017.

Brian Dolhansky and Cristian Canton Ferrer. Adversarial collision attacks on image hashing functions. CVPR Workshop on Adversarial Machine Learning, 2021.

C. Szegedy, W. Liu, Y. Jia, P. Sermanet, S. Reed, D. Anguelov, D. Erhan, V. Vanhoucke, and A. Rabinovich. Going deeper with convolutions. In Proceedings of the IEEE conference on computer vision and pattern recognition, pp. 1-9, 2015.

Christian Szegedy, Wojciech Zaremba, Ilya Sutskever, Dumitru Erhan Joan Bruna, Ian Goodfellow, and Rob Fergus. Intriguing properties of neural networks. In ICLR, 2013.

D. Tsipras, S. Santurkar, L. Engstrom, A. Turner, and A. Madry. Robustness may be at odds with accuracy. In ICLR, 2019.

Dan Hendrycks, Norman Mu, Ekin D. Cubuk, Barret Zoph, Justin Gilmer, and Balaji Lakshminarayanan. Augmix: A simple data processing method to improve robustness and uncertainty. ICLR, 2020.

Dou Goodman, Hao Xin, Wang Yang, Wu Yuesheng, Xiong Junfeng, and Zhang Huan. Advbox: a toolbox to generate adversarial examples that fool neural networks. arXiv preprint arXiv:2001.05574, 2020.

Eric Wong, Leslie Rice, and J. Zico Kolter. Fast is better than free: Revisiting adversarial training. ICLR, 2020.

Gavin Weiguang Ding, Luyu Wang, and Xiaomeng Jin. AdverTorch v0.1: An adversarial robustness toolbox based on pytorch. arXiv preprint arXiv:1902.07623, 2019.

Giorgos Tolias, Filip Radenovic, and Ondrej Chum. Targeted mismatch adversarial attack: Query with a flower to retrieve the tower. In Proceedings of the IEEE/CVF International Conference on Computer Vision, pp. 5037-5046, 2019.

Hongyang Zhang, Yaodong Yu, Jiantao Jiao, Eric P. Xing, Laurent El Ghaoui, and Michael I. Jordan. Theoretically principled trade-off between robustness and accuracy. In ICML, 2019.

I. Goodfellow, J. Shlens, and C. Szegedy. Explaining and harnessing adversarial examples. arXiv preprint arXiv:1412.6572v3, 2014.

Jonas Rauber, Wieland Brendel, and Matthias Bethge. Foolbox: A python toolbox to benchmark the robustness of machine learning models. In ICML Reliable Machine Learning in the Wild Workshop, 2017.

Kevin Eykholt, Ivan Evtimov, Earlence Fernandes, Bo Li, Dawn Song, Tadayoshi Kohno, Amir Rahmati, Atul Prakash, and Florian Tramer. Note on attacking object detectors with adversarial stickers. arXiv preprint arXiv:1712.08062, 2017.

Logan Engstrom, Andrew Ilyas, Shibani Santurkar, Dimitris Tsipras, Brandon Tran, and Aleksander Madry. Adversarial robustness as a prior for learned representations. arXiv preprint arXiv:1906.00945, 2019.

Maksym Andriushchenko and Nicolas Flammarion. Understanding and improving fast adversarial training. NeurIPS, 2020.

Maksym Andriushchenko, Francesco Croce, Nicolas Flammarion, and Matthias Hein. Square attack: a query-efficient black-box adversarial attack via random search. In ECCV, 2020.

Marco Melis, Ambra Demontis, Maura Pintor, Angelo Sotgiu, and Battista Biggio. secml: A python library for secure and explainable machine learning. arXiv preprint arXiv:1912.10013, 2019.

Maria-Irina Nicolae, Mathieu Sinn, Minh Ngoc Tran, Beat Buesser, Ambrish Rawat, Martin Wistuba, Valentina Zantedeschi, Nathalie Baracaldo, Bryant Chen, Heiko Ludwig, Ian Molloy, and Ben Edwards. Adversarial robustness toolbox v1.2.0. arXiv preprint arXiv:1807.01069, 2018.

Minseon Kim, Jihoon Tack, and Sung Ju Hwang. Adversarial self-supervised contrastive learning. NeurIPS, 2020.

N. Papernot, P. McDaniel, and I. Goodfellow. Transferability in machine learning: from phenomena to black-box attacks using adversarial samples. arXiv preprint arXiv:1605.07277, 2016.

Nicolas Papernot, Fartash Faghri, Nicholas Carlini, Ian Goodfellow, Reuben Feinman, Alexey Kurakin, Cihang Xie, Yash Sharma, Tom Brown, Aurko Roy, Alexander Matyasko, Vahid Behzadan, Karen Hambardzumyan, Zhishuai Zhang, Yi-Lin Juang, Zhi Li, Ryan Sheatsley, Abhibhav Garg, Jonathan Uesato, Willi Gierke, Yinpeng Dong, David Berthelot, Paul Hendricks, Jonas Rauber, and Rujun Long. Technical report on the cleverhans v2.1.0 adversarial examples library. arXiv preprint arXiv:1610.00768, 2018.

Parsa Saadatpanah, Ali Shafahi, and Tom Goldstein. Adversarial attacks on copyright detection systems. In ICML, 2020.

S. Thys, W. Van Ranst, and T. Goedeme. Fooling automated surveillance cameras: adversarial patches to attack person detection. arXiv preprint arXiv:1904.08653, 2019.

S.-M. Moosavi-Dezfooli, A. Fawzi, and P. Frossard. Deepfool: a simple and accurate method to fool deep neural networks. In Proceedings of the IEEE Conference on Computer Vision and Pattern Recognition, pp. 2574-2582, 2016.

Shang-Tse Chen, Cory Cornelius, Jason Martin, and Duen Horng Chau. ShapeShifter: Robust physical adversarial attack on faster r-CNN object detector. In Machine Learning and Knowledge Discovery in Databases, pp. 52-68. Springer International Publishing, 2019. doi: 10.1007/978-3-030-10925-7 4.

Sven Gowal, Chongli Qin, Jonathan Uesato, Timothy Mann, and Pushmeet Kohli. Uncovering the limits of adversarial training against norm-bounded adversarial examples. arXiv, 2020.

T. Brown, D. Mane, A. Roy, M. Abadi, and J. Gilmer. Adversarial patch. arXivpreprintarXiv:1712.09665, 2017.

Yonglong Tian, Chen Sun, Ben Poole, Dilip Krishnan, Cordelia Schmid, and Phillip Isola. What makes for good views for contrastive learning? NeurIPS, 2020.

S. Baba, L. Krekor, T. Arif, and Z. Shaaban. Watermarking scheme for copyright protection of digital images. IJCSNS, 9(4), 2009.

J. Buchner. Imagehash. https://pypi.org/ project/ImageHash/, 2021.

Content Authenticity Initiative (CAI). Setting the standard for content attribution. Technical report, Adobe Inc., 2020.

Z. Cao, M. Long, J. Wang, and P. S. Yu. Hashnet: Deep learning to hash by continuation. In Proc. CVPR, pp. 5608-5617, 2017.

T. Chen, S. Kornblith, M. Norouzi, and G. Hinton. A simple framework for contrastive learning of visual representations. In Proc. ICML, pp. 1597-1607, 2020.

J. Collomosse, T. Bui, A. Brown, J. Sheridan, A. Green, M. Bell, J. Fawcett, J. Higgins, and O. Thereaux. ARCHANGEL: Trusted archives of digital public docu- ments. In Proc. ACM Doc.Eng, 2018.

IPTC Council. Social media sites photo metadata test results. http://embeddedmetadata.org/social-media-test-results.php, 2020.

J. Deng, W. Dong, R. Socher, L.-J. Li, K. Li, and L. Fei-Fei. ImageNet: A Large-Scale Hierarchical Image Database. In Proc. CVPR, 2009.

P. Devi, M. Venkatesan, and K. Duraiswamy. A fragile watermarking scheme for image authentication with tamper localization using integer wavelet transform. J. Computer Science, 5(11):831-837, 2009.

B. Dolhansky, J. Bitton, B. Pflaum, J. Lu, R. Howes, M. Wang, and C. C. Ferrer. The deepfake detection challenge (DFDC) dataset. CoRR, abs/2006.07397, 2020.

J. Aythora et al. Multi-stakeholder media provenance management to counter synthetic media risks in news publishing. In Proc. Intl. Broadcasting Convention (IBC), 2020.

Andreas Geiger, Philip Lenz, Christoph Stiller, and Raquel Urtasun. Vision meets robotics: The kitti dataset. International Journal of Robotics Research (IJRR), 2013.

A.Gordo, J.Almazan, J. Revaud, and D. Larlus. Deep image retrieval: Learning global representations for image search. In Proc. ECCV, pp. 241-257, 2016.

R. Hadsell, S. Chopra, and Y. LeCun. Dimensionality reduction by learning an invariant mapping. In Proc. CVPR, pp. 1735-1742, 2006.

(56) References Cited

OTHER PUBLICATIONS

K. He, X. Zhang, S. Ren, and J. Sun. Deep residual learning for image recognition. In Proc. CVPR, pp. 770-778, 2015.
S. Heller, L. Rossetto, and H. Schuldt. The PS-Battles Dataset—an Image Collection for Image Manipulation Detection. CoRR, abs/1804.04866, 2018.
Dan Hendrycks, Steven Basart, Norman Mu, Saurav Kadavath, Frank Wang, Evan Dorundo, Rahul Desai, Tyler Zhu, Samyak Parajuli, Mike Guo, et al. The many faces of robustness: A critical analysis of out-of-distribution generalization. arXiv preprint arXiv:2006.16241, 2020.
D. Hendrycks and T. Dietterich. Benchmarking neural network robustness to common corruptions and perturbations. In Proc. ICLR, 2019.
S. Jenni and P. Favaro. Self-supervised feature learning by learning to spot artifacts. In Proc. CVPR, 2018.
J. Johnson, M. Douze, and H. Jegou. Billion-scale similarity search with gpus. IEEE Transactions on Big Data, 2017.
S. Gilani, K. Hameed, A. Mumtax. Digital image watermarking in the wavelet transform domain. WASET, 13:86-89, 2006.
F. Khelifi and A. Bouridane. Perceptual video hashing for content identification and authentication. IEEE TCSVT, 1(29), 2019.
A. Krizhevsky, I. Sutskever, and G. Hinton. Imagenet classification with deep convnets. In Proc. NIPS, 2012.
Z. Lenyk and J. Park. Microsoft vision model resnet-50 combines web-scale data and multi-task learning to achieve state of the art. https://pypi.org/project/ microsoftvision/, 2021.
Q. Li, Z. Sun, R. He, and T. Tan. Deep supervised discrete hashing. In Proc. NeurIPS, pp. 2482-2491, 2017.
Y. Li, M-C. Ching, and S. Lyu. In ictu oculi: Exposing ai created fake videos by detecting eye blinking. In Proc. IEEE WIFS, 2018.
H. Liu, R. Wang, S. Shan, and X. Chen. Deep supervised hashing for fast image retrieval. In Proc. CVPR, pp. 2064-2072, 2017.
M. Huh, A. Liu, A. Owens, and A. Efros. Fighting fake news: Image splice detection via learned self-consistency. In Proc. ECCV, 2018.
Github.com—ISCC—Specification v1.0.0—Date downloaded Aug. 19, 2022; https://github.com/iscc/iscc-specs/blob/version-1.0/docs/specification.md.
D. Profrock, M. Schlauweg, and E. Muller. Content-based watermarking by geometric wrapping and feature-based image segmentation. In Proc. SITIS, pp. 572-581, 2006.
Z. Teed and J. Deng. Raft: Recurrent all-pairs field transforms for optical flow. In Proc. ECCV, pp. 402-419. Springer, 2020.
P. Torr and A. Zisserman. Mlesac: A new robust estimator with application to estimating image geometry. Computer Vision Image Understanding (CVIU), 78(1):138-156, 2000.
J. Wang, H. T. Shen, J. Song, and J.Ji. Hashing for similarity search: A survey. arXiv preprint arXiv:1408.2927, 2014.
S-Y. Wang, O. Wang, A. Owens, R. Zhang, and A. Efros. Detecting photoshopped faces by scripting photoshop. In Proc. ICCV, 2019.
S-Y. Wang, O. Wang, R. Zhang, A. Owens, and A. Efros. Cnn-generated images are surprisingly easy to spot . . . for now. In Proc. CVPR, 2020.
W. Wang, J. Dong, and T. Tan. Tampered region localization of digital color images based on jpeg compression noise. In International Workshop on Digital Watermarking, pp. 120-133. Springer, 2010.
Y. Wu, W. AbdAlmageed, and P. Natarajan. Mantra-net: Manipulation tracing network for detection and localization of image forgeries with anomalous features. In Proc. CVPR, pp. 9543-9552, 2019.
N. Yu, L. Davis, and M. Fritz. Attributing fake images to gans: Learning and analyzing gan fingerprints. In IEEE International Conference on Computer Vision (ICCV), 2019.
L. Yuan, T. Wang, X. Zhang, F. Tay, Z. Jie, W. Liu, and J. Feng. Central similarity quantization for efficient image and video retrieval. In Proc. CVPR, pp. 3083-3092, 2020.
C. Zauner. Implementation and benchmarking of perceptual image hash functions. Master's thesis, Upper Austria University of Applied Sciences, Hagenberg, 2010.
H. Zhu, M. Long, J. Wang, and Y. Cao. Deep hashing network for efficient similarity retrieval. In Proc. AAAI, 2016.

\* cited by examiner

| Method | Benign | | | Manip | | | Manip+Benign | | | Average | | |
|---|---|---|---|---|---|---|---|---|---|---|---|---|
| | IR@1 | IR@10 | IR@100 | IR@1 | IR@10 | IR@100 | IR@1 | IR@10 | IR@100 | IR@1 | IR@10 | IR@100 |
| Ours (stage 1 + 2) | 0.9003 | 0.9331 | 0.9408 | 0.9206 | 0.9300 | 0.9300 | 0.8028 | 0.8312 | 0.8412 | 0.8745 | 0.8981 | 0.9039 |
| Ours (stage 1) | 0.7585 | 0.8788 | 0.9408 | 0.8108 | 0.8817 | 0.9300 | 0.5723 | 0.7323 | 0.8412 | 0.7138 | 0.8309 | 0.9039 |
| MSResNet fine. | 0.7203 | 0.8499 | 0.9202 | 0.8162 | 0.8905 | 0.9314 | 0.5582 | 0.7147 | 0.8289 | 0.6982 | 0.8184 | 0.8935 |
| ImageNet fine. | 0.6691 | 0.8226 | 0.9084 | 0.7858 | 0.8676 | 0.9128 | 0.4801 | 0.6614 | 0.7902 | 0.6450 | 0.7839 | 0.8705 |
| DeepAugMix [17] | 0.4899 | 0.5907 | 0.6743 | 0.8885 | 0.9402 | 0.9611 | 0.3828 | 0.4962 | 0.5965 | 0.5870 | 0.6757 | 0.7439 |
| MSResNet [24] | 0.1548 | 0.2567 | 0.3885 | 0.8807 | 0.9358 | 0.9662 | 0.1020 | 0.1898 | 0.3108 | 0.3792 | 0.4608 | 0.5552 |
| ImageNet [19] | 0.220 | 0.3113 | 0.4056 | 0.8797 | 0.9260 | 0.9527 | 0.1640 | 0.2498 | 0.341 | 0.4212 | 0.4957 | 0.5673 |
| CSQ [57] | 0.0353 | 0.0873 | 0.2286 | 0.3274 | 0.4257 | 0.6179 | 0.0222 | 0.0611 | 0.1818 | 0.1283 | 0.1914 | 0.3428 |
| HashNet [4] | 0.0635 | 0.1274 | 0.2310 | 0.4611 | 0.5618 | 0.6726 | 0.0349 | 0.0797 | 0.1606 | 0.1865 | 0.2563 | 0.3547 |
| pHash [40] | 0.3218 | 0.3382 | 0.3321 | 0.3662 | 0.3743 | 0.3760 | 0.1529 | 0.1612 | 0.1658 | 0.2803 | 0.2879 | 0.2913 |

Fig. 5

| Method | Accuracy (IoU) | | Interp. (%) | |
|---|---|---|---|---|
| | I | No I | No I | I |
| ICN (Ours) | 0.551 | 0.563 | 77.8 | 85.2 |
| ResNetConv+Geo. Align. $\mathcal{F}_A$ | 0.243 | 0.243 | 7.84 | 3.87 |
| ResNetConv [15] | 0.238 | 0.239 | 5.88 | 2.58 |
| SSD+Geo. Align. $\mathcal{F}_A$ | 0.231 | 0.231 | 1.31 | 3.23 |
| SSD | 0.149 | 0.154 | 3.27 | 0.65 |
| ErrAnalysis+Geo. Align. $\mathcal{F}_A$ | 0.143 | 0.011 | 1.31 | 0.00 |
| ErrAnalysis [36] | 0.109 | 0.025 | 1.31 | 0.00 |
| MantraNet+Geo. Align. $\mathcal{F}_A$ | 0.061 | 0.091 | 0.65 | 1.29 |
| MantraNet [37] | 0.027 | 0.036 | 0.65 | 3.23 |

*Fig. 9*

| Method | Detection (AP) | Localization (IoU) |
|---|---|---|
| Full | 0.989 | 0.6543 |
| No Geo. Align. $\mathcal{F}_A$ | 0.860 | 0.4314 |
| No Pred. Mod. $\mathcal{F}_P$ | 0.943 | 0.5652 |
| Frozen Pred. Mod. $\mathcal{F}_P$ | 0.874 | 0.5333 |
| Frozen Geo. Align. $\mathcal{F}_A$ | 0.929 | 0.5315 |
| No $\mathcal{L}_C$ | 0.450 | 0.0000 |
| No $\mathcal{L}_T$ | 0.955 | 0.1683 |

Aligning A First Image With A Second Image To Generate An Aligned Image
_1210_

Generating A Fused Feature Vector By Combining Deep Features From The Aligned Image And The Second Image _1220_

Generating One Or More Visual Indicators From The Fused Feature Vector
_1230_

1300 

```
┌─────────────────────────────────────────────────────────────────┐
│ Searching A Set Of Trusted Digital Images For A Trusted Near-Duplicate │
│                    Image To A Query Image 1310                   │
└─────────────────────────────────────────────────────────────────┘
                                  │
                                  ▼
┌─────────────────────────────────────────────────────────────────┐
│  Aligning The Query Image To The Trusted Near-Duplicate Image To │
│         Generate An Aligned Query Image 1320                     │
└─────────────────────────────────────────────────────────────────┘
                                  │
                                  ▼
┌─────────────────────────────────────────────────────────────────┐
│ Generating A Fused Feature Vector By Combining Deep Features Form The │
│     Aligned Query Image And The Trusted Near-Duplicate Image 1330 │
└─────────────────────────────────────────────────────────────────┘
                                  │
                                  ▼
┌─────────────────────────────────────────────────────────────────┐
│  Determining Whether Changes To The Query Image Relative To The  │
│ Trusted Near-Duplicate Image Comprise Benign Changes Or Editorial│
│                        Changes 1340                              │
└─────────────────────────────────────────────────────────────────┘
```

*Fig. 13*

IDENTIFYING AND LOCALIZING EDITORIAL CHANGES TO IMAGES UTILIZING DEEP LEARNING

BACKGROUND

Recent years have seen significant advancements in computer-implemented models for modifying digital images. Due to the prevalence, ease of use, and capability of image editing software, it is common for users to edit images. Images, particularly images posted online, are often modified to change a story that the image tells and potentially spread misinformation. Unfortunately, it can be difficult or impossible for a person to determine whether an image has been modified. Thus, there exists a need for tools to aid users in determining whether a digital image is an original or has been editorially modified.

SUMMARY

This disclosure describes one or more embodiments of systems, methods, and non-transitory computer readable media that solve one or more problems in the art with an image comparison system that includes a deep image comparator model and optionally an image retrieval model. The deep image comparator model compares images to identify regions of an image that have been editorially modified. For example, the deep image comparator model compares a pair of images to localize regions that have been manipulated to differ from an original or trusted image. The deep image comparator model is robust and ignores discrepancies due to benign image transformations that commonly occur during electronic image distribution, particularly via the Internet. The image retrieval model utilizes a visual search embedding that is robust to minor manipulations or benign modifications of images. The image retrieval model utilizes a visual search embedding for an image to robustly identify near duplicate images circulating online or a near duplicate image in a trusted database.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which:

FIG. 5 illustrates retrieval performance of the image retrieval model compared to state-of-the-art image search models in accordance with one or more embodiments;

FIG. 9 illustrates the accuracy and interpretability of visual localizations of editorial image manipulations generated by the deep image comparator model in accordance with one or more embodiments;

FIG. 10 illustrates the results of an ablation study of various features of the deep image comparator model in accordance with one or more embodiments;

FIG. 13 illustrates a flowchart of a series of acts for utilizing a deep image retrieval model to determine whether changes to a digital image include benign changes or editorial changes in accordance with one or more embodiments.

DETAILED DESCRIPTION

Figure 1:
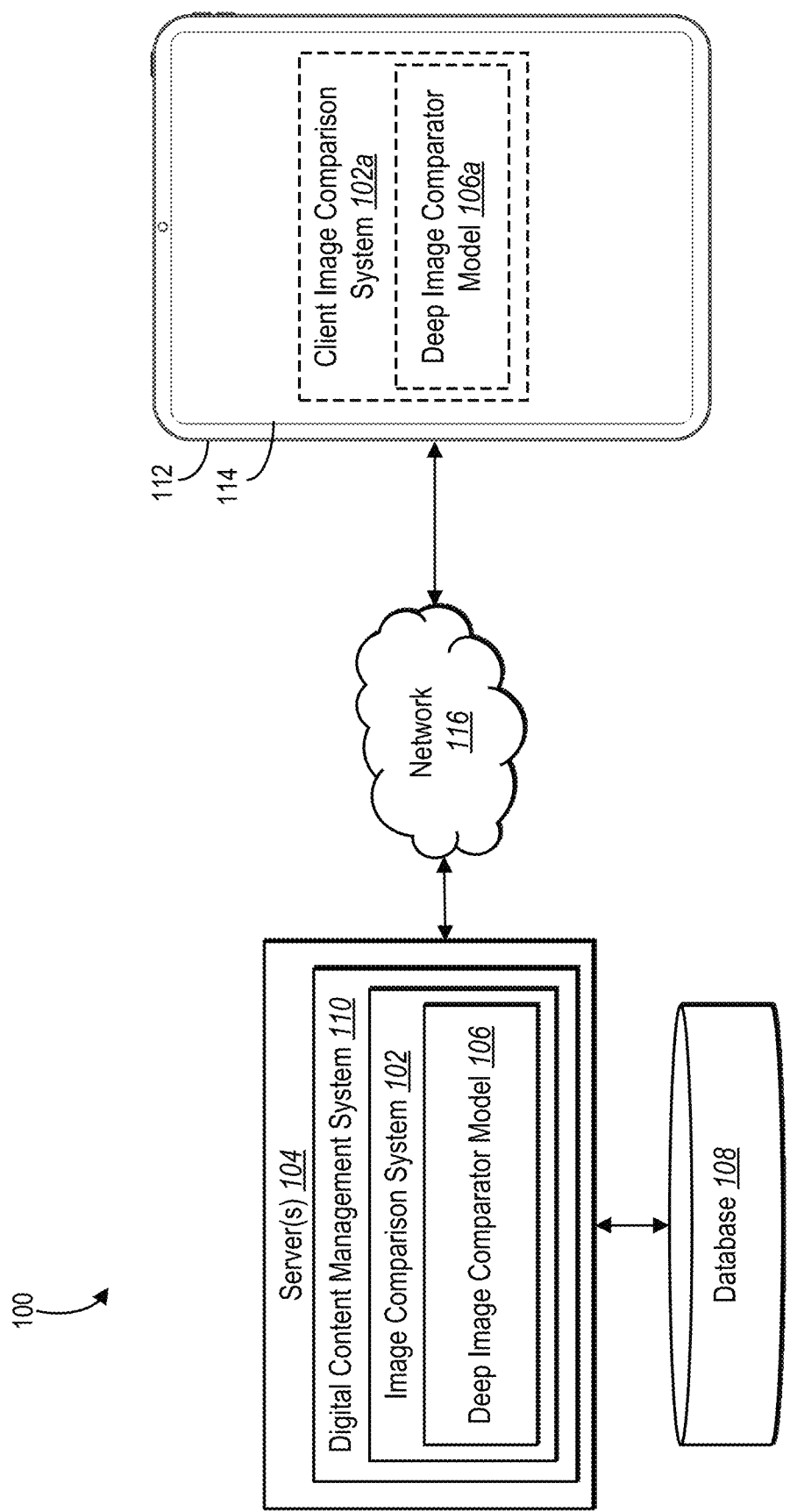
FIG. 1 illustrates an example system environment in which an image comparison system operates in accordance with one or more embodiments.

This disclosure describes one or more embodiments of an image comparison system that utilizes deep learning to identify regions of an image that have been editorially modified. For example, the image comparison system includes a deep image comparator model that compares a pair of images and localizes regions that have been editorially manipulated relative to an original or trusted image. More specifically, the deep image comparator model generates and surfaces visual indications of the location of such editorial changes on the modified image. The deep image comparator model is robust and ignores discrepancies due to benign image transformations that commonly occur during electronic image distribution, particularly via the Internet.

Additionally, one or more implementations of the image comparison system includes a deep image retrieval model. In particular, the deep image retrieval model learns to generate visual search embeddings for digital images utilizing a contrastive loss that helps ensure that the visual search embedding is robust to minor manipulations or benign modifications of images. The deep image retrieval model utilizes the visual search embedding for a trusted image to robustly search for and identify near duplicate images circulating online or in other locations. Once located, the image comparison system utilizes the deep image comparator model to locate and surface any editorial changes in modified versions of the trusted digital image returned as near duplicate images.

In one or more implementations, the image comparison system matching images to originals images or trusted images contained within a trusted database. The image comparison system also highlights any discrepancies due to digital manipulation of the image. In particular, in one or more implementations, the image comparison system performs a robust near-duplicate image search to perform identify matching digital image. For example, the image comparison system find matches in a trusted database for a query digital image for which a user desires to determine an authenticity. Alternatively, the image comparison system finds matches online, within a third-party database, or on social media for a trusted image for which a user desires to determine if fakes or modified versions exist in the wild. The image comparison system utilizes a robust deep image retrieval system that is able to identify near duplicate image despite the presence of manipulations (editorial or benign). In other words, the deep image retrieval system is robust to images with different resolution, quality format, or form factor.

The image comparison system utilizes a deep image comparator model to compare a query image and a matched trusted image and localize regions within the query image that have been manipulated to differ from the matched trusted image. The deep image comparator model localizes only editorial changes and ignores discrepancies due to benign image transformations (e.g., non-editorial changes) that commonly occur during online redistribution. For example, the deep image comparator model ignores (i.e., will not highlight) artifacts due to noise and recompression degradation, as well as out-of-place transformations due to image padding, warping, and changes in size and shape. The deep image comparator model is robust towards out-of-place transformations via an end-to-end training of a differentiable warping module within the comparator architecture. Thus, in one or more implementations, the image comparison system allows users to trace any image on the Internet back to a trusted source and identify what—if any—manipulations have been made to the image. This allows the user to make more informed decisions on whether to trust a story told by the image.

In some embodiments, the image comparison system also generates and provides a manipulation prediction for a digital image. For example, upon identifying a matching digital image, the image comparison system utilizes the deep image comparator model to determine the type or classification of modifications between a particular digital image and a matching digital image. To illustrate, the image comparison model generates a manipulation prediction and provide the manipulation prediction for display. In particular, in one or more implementations, the deep image comparator model predicts a probability that the query image has undergone benign manipulation, editorial manipulation, or whether the input pair of images are completely different images. Accordingly, the image comparison system can train a deep neural network to identify, localize, and classify editorial changes to an image while being invariant to kinds of transformation that digital content undergoes during redistribution (e.g., transcoding).

As mentioned above, conventional systems have a number of technical shortcomings with regard to accuracy, security, flexibility, and efficiency. For example, although conventional systems can encode and retrieve digital images, conventional systems are often fooled that these encoded features will match inaccurate digital images (or fail to match any digital images). Recent research has illustrated that adversarial models can generate adversarial images that fool conventional image retrieval and hashing models. For example, adversarial models can exactly match the perceptual hashes of unrelated images by using small $\ell_2$ or $\ell_\infty$ adversarial perturbations. Indeed, this problem is "symmetric" in that attackers can generate digital images that will fool models and/or poison a database of images (e.g., that would lead to incorrect matching of benign images as matching trusted originals). Thus, these adversarial models undermine the security and accuracy of conventional systems that match digital images and provide provenance data.

Some conventional systems seek to avoid these adversarial attacks through a security-by-obscurity approach. In particular, if the attacker does not know the model and cannot repeatedly query the model, then it is more difficult to generate adversarial images. Although this approach is easy to implement, it undermines flexibility and is not fully reliable. Indeed, models for image fingerprinting are increasingly deployed to client devices. Such deployment means that attackers can reverse engineer these models and gain white-box access for generating adversarial attacks. Accordingly, conventional approaches rigidly limit deployment options or undermine reliability of conventional systems that seek to avoid adversarial attacks.

Furthermore, many conventional systems are already computationally expensive to train and implement. For example, training large-scale models on millions of digital images already requires significant computer resources (in processing power and memory). Conventional systems have not identified an approach to address these adversarial attacks, in part, because any solution would make the computational burden of implementing models prohibitively expensive.

Robustly matching and comparing images is challenging, as image content may be also modified for non-editorial reasons during redistribution. Images are commonly subject to benign transformations such as changes in size, shape, quality or format by the platforms upon which they are shared. Images may also be 'manipulated' for editorial reasons, including to alter or falsify their stories. As such conventional cryptographic (bit-level) hashing often fails when attempting to match such images. Similarly, conventional simple pixel difference operations used to visualize changes will include benign changes making it difficult to identify editorial changes. For example, a sum of squared difference operation is particularly ineffective when the image has undergone warping or cropping.

As suggested above, embodiments of the image comparison system can provide a variety of advantages over conventional image modification systems. For example, embodiments of the image comparison system can improve accuracy and security by utilizing deep image models that are robust to benign changes, including warping and cropping. In particular, the image comparison system learns a visual search embedding that exhibits improved robustness to minor manipulations or benign modifications of images. The image comparison system applies contrastive training to train a deep image retrieval model using a dataset of original photographs modified and combined with data augmentations simulating benign image modifications. This yields a visual search embedding for robustly matching a near duplicate query image circulating 'in the wild' to a trusted database of original images that is robust to benign modifications.

Similarly, the image comparison systems utilizes a deep image comparator model for comparing digital images to identify changes that ignores non-editorial changes. The deep image comparator model incorporates both a dewarping and image correlation module. The deep image comparator model is trained end-to-end to ignore out-of-place transformation of content e.g., due to padding or warping as well as in-place corruption due to noise. Given a query, and an original image (retrieved from a trusted database via a near-duplicate image search) the network produces a heatmap that localizes visual discrepancies due to editorial manipulation. Further, the network predicts a probability that the query image has undergone benign manipulation, editorial manipulation, or whether the input pair are completely different. The deep image comparator model is able to discriminate between changes due to benign transformation and editorial manipulation. Furthermore, the deep image comparator model is able to reject false positive results returned via the near-duplicate image search. In particular, the deep image comparator model improves accuracy of image retrieval by providing a probability that the images being searched are the same up to and including any benign transformations. Furthermore, the image comparison system can utilize these probabilities to re-rank results to improve image retrieval results.

The image comparison system can also improve flexibility and reliability. As an initial matter, the image comparison system can deploy deep image retrieval and deep image comparator models server-side or client-side. Moreover, the image comparison system can achieve the foregoing improvements without undermining efficiency of implementing systems.

Additional detail regarding the interactive image editing system will now be provided with reference to the figures. For example, FIG. 1 illustrates a schematic diagram of an example system environment (or "environment") 100 for implementing an image comparison system 102 in accordance with one or more embodiments. An overview of the image comparison system 102 is described in relation to FIG. 1. Thereafter, a more detailed description of the components and processes of the image comparison system 102 is provided in relation to the subsequent figures.

As shown, the environment 100 includes server(s) 104, a database 108, a client device 112, and a network 116. Each of the components of the environment communicate via the network 116, and the network 116 is any suitable network over which computing devices communicate. Example networks are discussed in more detail below in relation to FIG. 14.

As mentioned, the environment 100 includes a client device 112. The client device 112 is one of a variety of computing devices, including a smartphone, a tablet, a smart television, a desktop computer, a laptop computer, a virtual reality device, an augmented reality device, or another computing device as described in relation to FIG. 14. Although FIG. 1 illustrates a single instance of the client device 112, in some embodiments, the environment 100 includes multiple different client devices, each associated with a different user. The client device 112 communicates with the server(s) 104 via the network 116. For example, the client device 112 provides information to server(s) 104 indicating client device interactions (e.g., digital image selections, user interactions with one or more pixels of a digital image, or other input) and receives information from the server(s) 104 such as provenance information, a manipulation prediction, localization of editorial changes, and/or digital images. Thus, in some cases, the image comparison system 102 implemented via the server(s) 104 provides and receives information based on client device interaction via the client device 112.

As shown in FIG. 1, the client device 112 includes a client application 114. In particular, the client application 114 is a web application, a native application installed on the client device 112 (e.g., a mobile application, a desktop application, etc.), or a cloud-based application where all or part of the functionality is performed by the server(s) 104. Based on instructions from the client application 114, the client device 112 presents or displays information to a user, including digital images, provenance information, and/or manipulation information.

As illustrated in FIG. 1, the environment 100 includes the server(s) 104. The server(s) 104 generates, tracks, stores, processes, receives, and transmits electronic data, such as digital images, visual search embeddings, provenance information, or indications of editorial changes. For example, the server(s) 104 receives data from the client device 112 in the form of an indication of a client device interaction with a digital image. In response, the server(s) 104 transmits data to the client device 112 to cause the client device 112 to display or editorial changes for the digital image. The server(s) 104 can also monitor creation of digital images at the client device 112, receive digital images from the client device 112, and generate/store provenance information or editorial changes corresponding to the digital images.

In some embodiments, the server(s) 104 communicates with the client device 112 to transmit and/or receive data via the network 116. In some embodiments, the server(s) 104 comprises a distributed server where the server(s) 104 includes a number of server devices distributed across the network 116 and located in different physical locations. The server(s) 104 can comprise a content server, an application server, a communication server, a web-hosting server, a multidimensional server, or a machine learning server. The server(s) 104 can further access and utilize the database 108 to store and retrieve information such as digital images, digital image fingerprints, provenance information, editorial changes, augmented digital images, deep image retrieval models, deep image comparator models, and/or manipulation information.

As further shown in FIG. 1, the server(s) 104 also includes the image comparison system 102 as part of a digital content management system 110. For example, in one or more implementations, the digital content management system 110 can store, generate, modify, edit, enhance, provide, distribute, and/or share digital content, such as digital images. For example, the digital content management system 110 provides tools for the client device 112, via the client application 114, to display or manipulate pixels of digital images. In some implementations, the digital content management system 110 provides tools for refining digital images or displaying provenance information regarding digital images.

In one or more embodiments, the server(s) 104 includes all, or a portion of, the image comparison system 102. For example, the image comparison system 102 operates on the server(s) 104 to identify matching digital images, determine editorial changes, and provide localization of editorial changes to the client device 112. As illustrated, the image comparison system 102 can also include a deep image comparator model 106 to location and classify editorial changes.

In certain cases, the client device 112 includes all or part of the image comparison system 102. Indeed, as illustrated, the client device 112 can include a client image comparison system 102a with a deep image comparator model 106a with the same or similar functionality to the image comparison system 102. For example, the client device 112 can generate, obtain (e.g., download), or utilize one or more aspects of the image comparison system 102, such as the deep image comparator model 106a from the server(s) 104. Indeed, in some implementations, as illustrated in FIG. 1, the image comparison system 102 is located in whole or in part of the client device 112. For example, the client image comparison system 102a includes a web hosting application that allows the client device 112 to interact with the server(s) 104. To illustrate, in one or more implementations, the client device 112 accesses a web page supported and/or hosted by the server(s) 104.

For example, in some embodiments, the image comparison system 102 trains the deep image comparator model 106 via the server(s) 104. The server(s) 104 can provide the deep image comparator model 106 to the client device 112 for identifying and classifying editorial changes. In other embodiments, the server(s) 104 both train and implement the deep image comparator model. For example, the server(s) 104 can receive a digital image from the client device 112, generate a visual search embedding of the digital image, compare the visual search embedding to other visual search embedding to identify a matching digital image, determine and surface editorial changes relative to the matching digital image to the client device 112.

Although FIG. 1 illustrates a particular arrangement of the environment, in some embodiments, the environment has a different arrangement of components and/or may have a different number or set of components altogether. For instance, as mentioned, the image comparison system 102 is implemented by (e.g., located entirely or in part on) the client device 112. In addition, in one or more embodiments, the client device 112 communicates directly with the image comparison system 102, bypassing the network 116.

Figure 2:
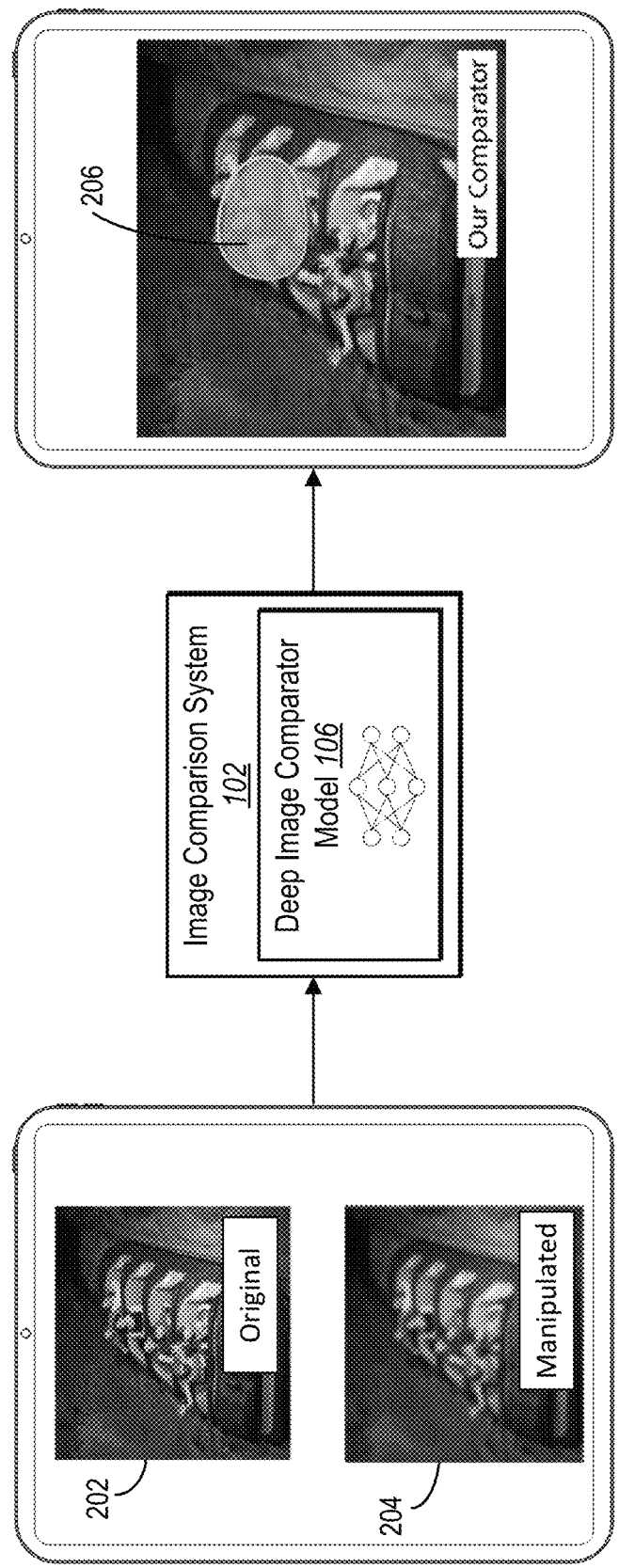
FIG. 2 illustrates an overview of determining and visually localizing editorial image modifications in accordance with one or more embodiments.

As mentioned, in one or more embodiments, the image comparison system 102 utilizes a deep image comparator model to identify editorial changes to a digital image. FIG. 2 illustrates an overview of identifying and surfacing editorial changes to a digital image utilizing a deep image comparator model 106 in accordance with one or more embodiments.

For example, FIG. 2 illustrates the image comparison system 102 receives or identifies a trusted or original digital image 202. The image comparison system 102 receives or identifies a query digital image 204 that has been manipulated relative to the trusted or original digital image 202. In other words, the digital image 204 has been modified from its original source image 202. Specifically, the digital image 204 includes a modifications of warping and blurring due to online distribution. The digital images also includes an editorial modification of the woman in the second to last row having her hands raised when they are down in the trusted or original digital image 202.

The trusted or original digital image refers to a digital image with known provenance information (e.g., known source data). For example, a trusted digital image can include digital images stored in a database with a reference or link to a provenance information. In some embodiments, a trusted digital image can include provenance data (e.g., stored in metadata of the digital image). In some cases, a trusted digital image is an original digital image or one that has not been modified from its creation.

Provenance information (e.g., source data) can include a variety of digital information identifying the source, origin, creation, or history of a digital image. For example, provenance information can indicate an author, creator, owner, copyright holder, publisher, or creation location of a digital image. Provenance information can also include revision information (e.g., versions, revisions, and/or revision dates). Thus, provenance information can include a variety of information for providing correct attribution for a digital image.

The image comparison system 102 utilizes the deep image comparator model 106 to identify and provide a visual indication of editorial changes in the query image 204 relative to the trusted image 202. For example, FIG. 2 illustrates that the deep image comparator model 106 highlights a region of the query image 202 with a visual indicator 206. The visual indicator 206 identifies the location of the editorial modification (woman's hand are raised) in the query image 204 relative to the trusted image 202. Furthermore, the deep image comparator model 106 identifies the editorial modification while ignoring the benign modifications/transformations of the warping and blurring.

The image comparison system 102 can provide a notification to an author, owner, copyright holder indicating that the digital image 204 has been utilized and/or modified. For example, the image comparison system 102 can identify an owner of a digital image via the database 108. The image comparison system 102 can generate and provide an email, text message, pop-up notification, or other digital communication to the owner of the digital image indicating a website or application utilizing the digital image 204. Similarly, the notification can include an indication of the modification prediction, an owner of the website or application utilizing the digital image 204, and/or a selectable option to report an unauthorized use of the digital image 204.

Figure 3:
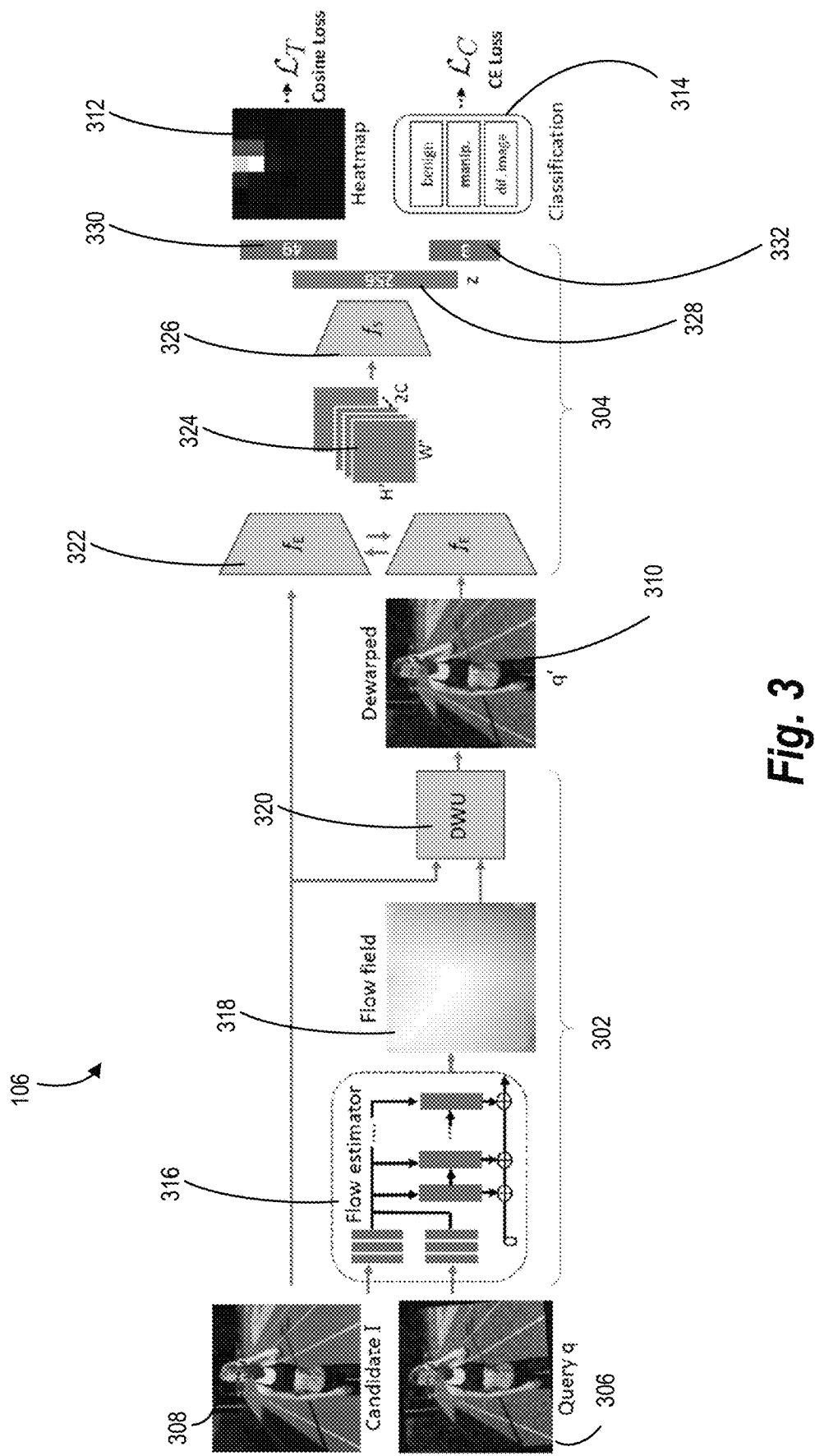
FIG. 3 illustrates an example architecture of a deep image comparator model of the image comparison system in accordance with one or more embodiments.

FIG. 3 provides additional detail regarding the deep image comparator model 106. Specifically, FIG. 3 illustrates that the deep image comparator model 106 includes a geometric alignment model 302 and a prediction model 304. The deep image comparator model 106 receives a query or first image 306 to compare with a second or trusted image 308. In one or more implementations the trusted image 308 is retrieved during a near-duplicate search by a deep image retrieval model as described below in reference to FIG. 4. The deep image comparator model 106 utilizes the geometric alignment model 302 to generate an aligned or dewarped image 310. The prediction model 304 then compares the aligned image 310 to the trusted image 308 by extracting deep features from both the trusted image 308 and the aligned image 310. Based on the deep features, the prediction model 304 generates a heat map 312 that localizes editorial changes and a 3-way classification 314 that indicates whether the query image 306 includes benign changes, editorial changes, or is a completely different image.

In practice, the query image 306 may undergo arbitrary transformation which alter the pixel placement relative (e.g., affine transformations or padding). To increase editorial change accuracy and make the deep image comparator model 106 more robust to benign modifications, the deep image comparator model 106 utilizes the geometric alignment model 302 to correct the alignment of the query image 306 relative to the source or trusted image 308. In particular, the deep image comparator model 106 utilizes an optical flow estimator 316 to estimate the optical flow or flow field 318 between the query image 306 and the trusted image 308.

As used herein, the term "optical flow estimate" or "estimated flow field" refers to motion of pixels needed to realistically transform or align the pixels of two images. In particular, the optical flow estimate includes data related to the movement and direction of pixels in the query image 306 needed to align them with corresponding pixels in the trusted image 308.

In one or more implementations, the optical flow estimator 316 comprises an optical flow prediction network. As used herein, the term "optical flow prediction network" refers to a neural network that is trained using a flow loss function and a ground truth flow to predict the optical flow prediction (e.g., the optical flow input) between images. In one or more implementations, the optical flow estimator 316 comprises an optical flow prediction network as described in U.S. Pat. No. 10,783,622 assigned to Adobe Inc., which is hereby incorporated by reference in its entirety. Alternatively, the optical flow estimator 316 comprises an image alignment system as described in U.S. Pat. No. 10,453,204 assigned to Adobe Inc., which is hereby incorporated by reference in its entirety. In still further implementations, the optical flow estimator 316 comprises a recurrent all-pairs transform for optical flow as described by Teed et al., in *Recurrent All-Pairs Field Transforms for Optical Flow*, In Proc. ECCV, pages 402-419, Springer, 2020, which is hereby incorporated by reference.

In one or more implementations the optical flow estimator 316 determines the alignment between the query image 306 or "q" and the trusted image 308 or ("I"). For example, the optical flow estimator 316 resizes both the query image 306 and the trusted image 308 to a fixed height (H) and a fixed width (W). The optical flow estimator 316 determines a dense pixel displacement field $\{\rho^x, \rho^y\} \in R^{H \times W}$ from q to I by computing correlation between the per-pixel features from all pairs of pixels.

Upon generating the optical flow estimate or flow field 318 the deep image comparator model 106 utilizes a de-warping unit 320 to apply the optical flow estimate 318 to the query image 306 to align the query image 306 to the trusted image 308. For example, the de-warping unit 320 warps by query image 306 by:

$$M:(x,y) \rightarrow (x+\rho^x(x), y+\rho^y(y))$$

$$DWU(q|\rho^x,\rho^y)=S(M) \in R^{H \times W}$$

where (x, y) refers to the pixel coordinates in the query image q which are mapped into its estimated correspondence M according to the optical flow $\{\rho^x, \rho^y\}$. S(.) is a bilinear sampler that effectively fits a local grid around M: $S(M)=\{M+\Delta M | \Delta M \in R^2, |\Delta M| <= 1\}$ where output coordinates are computed by linear interpolation. Thus, the de-warping unit 320 generates the aligned query image 310.

The trusted image 308 and the aligned query image 310 are then provided as inputs to the prediction model 304. In one or more implementations the prediction model 304 comprises a neural network. Generally, in one or more implementations, a neural network includes a machine learning model that can be tuned (e.g., trained) based on inputs to approximate unknown functions used for generating the corresponding outputs. Indeed, in some implementations, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, a neural network includes an algorithm (or set of algorithms) that implements deep learning techniques that utilize a set of algorithms to model high-level abstractions in data. To illustrate, in some implementations, a neural network includes a convolutional neural network, a recurrent neural network (e.g., a long short-term memory neural network), a generative adversarial neural network, a graph neural network, or a multi-layer perceptron. In some implementations, a neural network includes a combination of neural networks or neural network components.

The prediction model 304 extracts features or feature maps from each of the trusted image 308 and the aligned query image 310. For example, the prediction model 304 utilizes a neural network feature extractor 322 to generate feature maps 324. To illustrate, in some instances, a feature map 324 includes a set of values corresponding to latent and/or patent attributes and characteristics of an input analyzed by a neural network (e.g., a digital image). In particular, the deep image comparator model 106 generates a first set of deep features (e.g., a first set of feature maps) for the aligned query image 310 utilizing the neural network feature extractor 322. The deep image comparator model 106 generates a second set of deep features (e.g., a second set of feature maps) for the source image 308 utilizing the neural network feature extractor 322. For example, the deep image comparator model 106 extracts local features from each of the trusted image 308 and the aligned query image 310 using a shared CNN extractor. The feature maps 324 include H', W', and C, which are the new height, width, and feature dimension respectively. In one or more implementations, the neural network feature extractor 322 is 3 convolution layers separated by ReLU, batch norm and max pooling and outputs features at a ¼ resolution and C=128.

The deep image comparator model 106 then combines the feature maps 324 of the trusted image 308 and feature maps 324 of the aligned query image 310. For example, the concatenates the feature maps 324 of the trusted image 308 and feature maps 324 of the aligned query image 310. In other words, the deep image comparator model 106 generates a combination of the first set of deep features extracted from the aligned query image 310 and the second set of deep features extracted from the trusted image 308.

The deep image comparator model 106 generates a fused feature vector 328 or $z$ from the combined feature maps 324 utilizing a neural network encoder 326. For example, in one or more implementations, the neural network encoder 326 comprises four ResNet residual blocks followed by average pooling and a fully connected layer that outputs a 256-dimension fused feature vector 328.

The deep image comparator model 106 generates one or more visual indicators from the fused feature vector 328 utilizing one or more neural network layers 330. For example, the deep image comparator model 106 generates a heat map 312 from the fused feature vector 328 utilizing a multilayer perceptron 330. As used herein, a "heat map" refers to a graphical representation of data that conveys data indicating an editorial change or modification. In particular, a heat map can comprise a map of an image that indicates portions of the image likely to include an editorial change or modification. For example, every region of the heat map (e.g., every pixel) conveys a likelihood that the given pixel is part of an editorial change or modification.

Additionally, the deep image comparator model 106 generates a classification for modifications of the query image 306 relative to the trusted image 308. In particular, the deep image comparator model 106 generates a three-way classification 314 comprising a probability that the query image 306 has benign changes, a probability that the query image 306 has editorial changes; and a probability that the query image 306 is a different image from the trusted image 308. For example, the deep image comparator model 106 generates the classification from the fused feature vector 328 utilizing one or more additional neural network layers (e.g., a multilayer perceptron) 332.

To predict the query-candidate relationship and visualize the possible manipulated regions, the deep image comparator model 106 applies two losses on top of the fused feature vector 328 or $z$. The first loss is a 3-way cross entropy predicting whether the pair is benign (i.e., the query q is either identical or a benign transformed version of the candidate I), manipulated (i.e., q is a manipulated version of I) or of distinct images (i.e., I and q are two different instances). For example:

$$c = E_c(z) \in \mathbb{R}^3$$
$$\mathcal{L}_C = -\log \frac{e^{c_y}}{\sum_{i=1}^{3} e^{c_i}}$$

where $E_c(.)$ is a FC layer projecting $z$ to a 3-D feature c, and y is the classification target of the pair (q, I). $L_c$ is the first loss or classification loss.

The deep image comparator model 106 utilizes a second loss to minimize the cosine distance between the manipulation heatmap derived from z and the ground truth heatmap. The deep image comparator model 106 produces a heatmap at resolution t×t from $z$ via a FC layer, $E_t(z) \in R^{t^2}$ and compute a heatmap loss:

$$\mathcal{L}_T = 1 - \frac{E_t(z) \cdot T}{|E_t(z)||T|}$$

where T is the ground truth manipulation heatmap. T is a matrix of zeros if the pair (q, I) is benign, ones if different (distinct), and if a manipulated pair $T \in [0, 1]$ derived from ground truth annotations. The output heatmap is generated at a resolution t=7 during training. At test time, the 7×7 heatmap is interpolated to the original resolution H×W and super-imposed on the query image to generate the one or more visual indicators. In one or more implementations, the heat map is continuous but can be thresholded for more intuitive visualization. The total loss for the deep image comparator model 106 loss is:

$$\mathcal{L}(.) = w_c \mathcal{L}_c(.) + w_t \mathcal{L}_T(.)$$

where loss weights $w_c$ and $w_t$ are optimized or set empirically at 0.5.

As mentioned above, in one or more implementations, the image comparison system 102 includes an image retrieval model that performs a near duplicate search to identify potential source or target images corresponding to a query image. Alternatively, the image retrieval model that performs a near duplicate search to identify potential query images corresponding to a trusted or source image.

Figure 4:
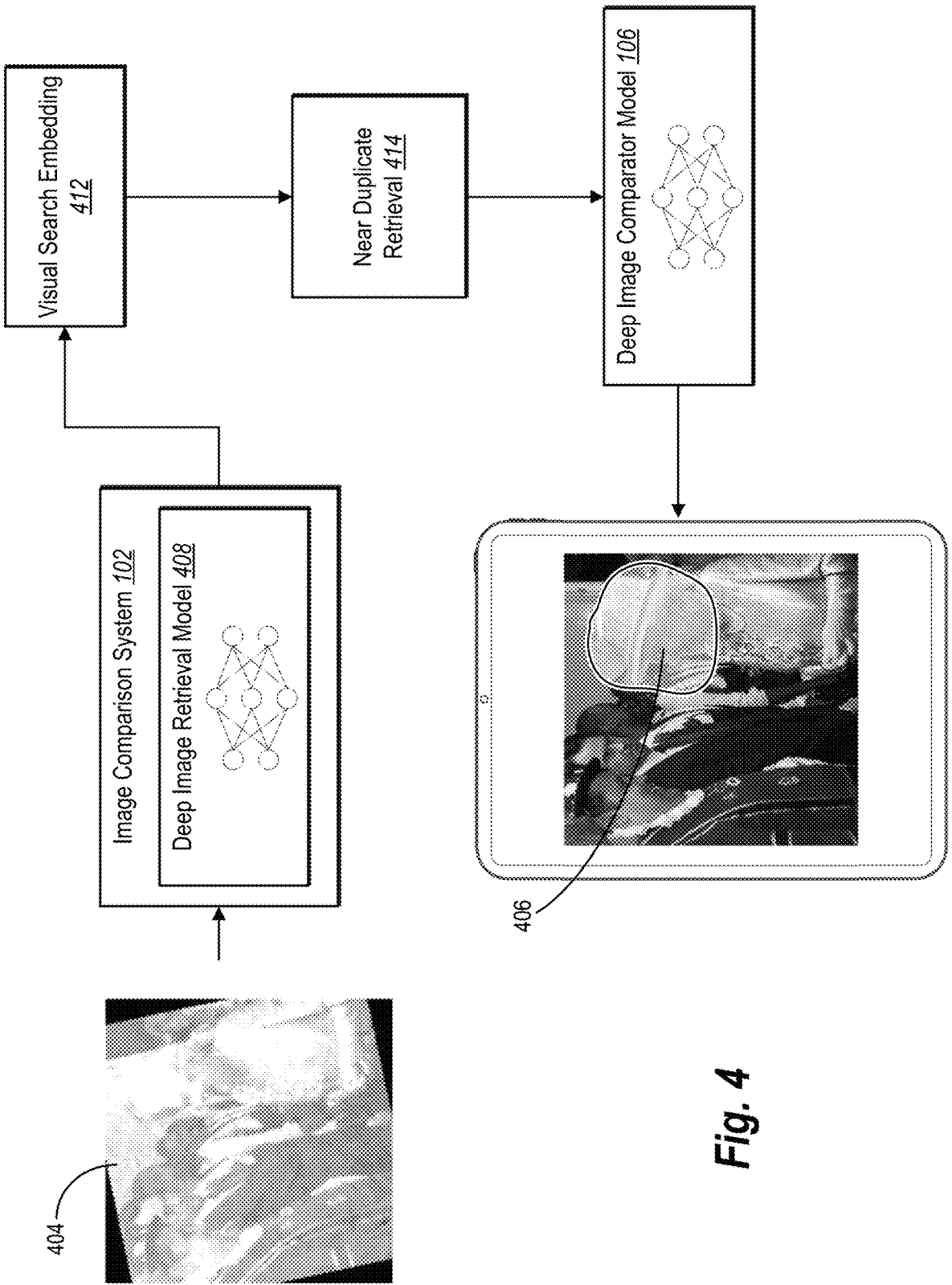
FIG. 4 illustrates identifying near duplicate images to a trusted image utilizing an image retrieval model and then determining and visually localizing editorial image modifications utilizing a deep image comparator model in accordance with one or more embodiments.

Turning to FIG. 4 more detail is provided regarding the image retrieval model. The image retrieval model 408 can include a variety of machine learning models for generating a visual search embedding (e.g., a computer-implemented model that can be trained and/or tuned based on inputs to determine classifications or approximate unknown functions). For instance, the image retrieval model 408 can include a decision tree model, a support vector machine, or a neural network.

To illustrate, the image retrieval model 408 can be implemented as a neural network that comprises a model of interconnected artificial neurons (e.g., organized in layers having learned parameters or weights) that communicate and learn to approximate complex functions. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network.

The image comparison system 102 can utilize a variety of model architectures for the image retrieval model 408. The image retrieval model 408 can include a machine learning model (such as a neural network) that generates an embedding of a digital image (e.g., an embedding within an image/search feature space). The image retrieval model 408 can generate embeddings (e.g., vectors) such that matching digital images are located nearer in feature space than non-matching digital images. Accordingly, the image retrieval model 408 can match digital images to source digital images (i.e., retrieve source digital images).

In some embodiments, the image retrieval model 408 is a convolutional neural network. For example, the image comparison system 102 can utilize a Res-Net convolutional neural network (e.g., Res-Net 50) as the image retrieval model 408. The image comparison system 102 can train the convolutional neural network on a large dataset of unlabeled images to generate embeddings and retrieve matching digital images. More specifically, the image comparison system 102 can train the image retrieval model 408 utilizing a robust contrastive learning approach that utilizes opposing objectives to generate augmented digital images and modify parameters of the image retrieval model 408.

In one or more implementations, the image retrieval model 408 includes a hashing model. The hashing model can generate a binary hash for the query image 404. Specifically, the hashing model can convert a visual search embedding 412 from the image retrieval model 408 to a binary hash. In one or more embodiments, the hashing model utilizes a sign function to generate a binary hash. In other embodiments, the hashing model can utilize a variety of other perceptual hashing algorithms.

As illustrated, the image retrieval model 408 generates the visual search embedding 412. For example, the visual search embedding 412 can include the binary hash generated from the hashing model. In one or more implementations, the image retrieval model 408 does not include a hashing model.

Moreover, the image comparison system 102 can utilize the visual search embedding 412 (or a binary hash thereof) to identify one or more matching digital images. For example, as illustrated in FIG. 4, the image comparison system 102 can perform an act 414 of near duplicate image retrieval. Specifically, the image comparison system 102 can compare the visual search embedding 412 with visual search embeddings of images in a trusted database of images. For example, the image comparison system 102 can generate visual search embeddings for the additional digital images (using the image retrieval model 408). The image comparison system 102 can then compare the visual search embedding 412 with the visual search embeddings for the additional digital images.

In one or more embodiments, the image comparison system 102 generates a database (e.g., the database 108) that includes the additional digital images (i.e., trusted digital images) with corresponding visual search embeddings and provenance information. Accordingly, the image comparison system 102 can compare the visual search embedding 412 and visual search embeddings of the additional digital images to identify a matching digital image with corresponding provenance information. In particular, the image comparison system 102 determines that the visual search embedding for an additional digital image is closest (e.g., most similar to) the visual search embedding 412. This comparison can include a variety of approaches such as a binary hash comparison or determining a distance between vectors within a feature space. The image comparison system 102 can also utilize an image comparator model 106 to determine and surface an editorial manipulation prediction 406 for the digital image 404 as described above.

More specifically, the deep image retrieval model 408 encodes digital images into a visual search embedding (e.g., a 256-D feature embedding). As discussed above, the deep image retrieval model 408 optionally binarizes the visual search embedding into a 128-bit hash for scalable search (e.g., a near duplicate retrieval). The deep image retrieval model 408 performs the search, in one or more embodiments to identify a shortlist of the most similar images to a users' query image.

Optionally, the top n results are passed to the deep image comparator model (each in turn, paired with the query image). The classification branch of the deep image comparator model culls false positive matches from the shortlist. The deep image comparator model surfaces a visualization the heatmap for the top ranked remaining results, which informs the user of differences between that image and the query that are due to editorial image manipulation. The classification branch of the comparator is also used to indicate the likelihood of the query image being a manipulated version of that result.

As mentioned above, the image comparison system 102 can utilize robust contrastive learning to train a deep image retrieval model 408. In particular, the image comparison system 102 can generate a visual search embedding of a digital image utilizing a deep image retrieval model 408 comprising parameters learned utilizing a contrastive loss between digital images and augmented digital images selected to increase the contrastive loss.

For example, the image comparison system 102, in one or more implementations, trains a single CNN model to encode a whole image into a compact embedding space. For example, in one or more implementations the image retrieval model 408 has a ResNet 50 model architecture is with the N-way classifier layer replaced by a 256-D fully connected (fc) layer as the embedding. The image retrieval model 408 encodes an image I is encoded to descriptor $z=f(I)\in R256$. In one or more implementations the image retrieval model 408 is initialized with the Deep-AugMix pretrained weight and trained with loss:

$$\mathcal{L}(z) = -\log \frac{\sum_i e^{d(z,z_i^+)/\tau} + \sum_t e^{d(z,z_t^+)/\tau}}{\sum_{z-} e^{d(z,z^-)/\tau}}$$

$$\text{where } d(u,v) = \frac{E_b(u) \cdot E_b(v)}{|E_b(u)||E_b(v)|}$$

where $E_b(.)$ is a fc layer which serves as a buffer be-tween the embedding and loss; $d(u, v)$ measures the cosine similarity between the intermediate embeddings $E_b(u)$ and $E_b(v)$; $\tau$ is the contrastive temperature. $z_i^+$ and $z_t^+$ refer to the embeddings of the benign-transformed and manipulated (also subjected to benign transformations) versions of image I respectively. While $z-$ is the embeddings of other images and its transformed versions in the mini-batch.

In one or more embodiments, the image comparison system 102 utilizes a contrastive loss similar to SimCLR loss as described by Ting Chen, Simon Kornblith, Mohammad Norouzi, and Geffrey Hinton in A simple framework for contrastive learning of visual representations, International Conference on Machine Learning, pages 1597-1607, PMLR, 2020, incorporated by reference herein in its entirety. The term measure of loss (or measure of contrastive loss) refers to a particular instance or value for a loss (e.g., a particular contrastive loss value).

The image comparison system 102 adapts SimCLR in a near-duplicate retrieval problem treating manipulated images as positives. During training, the image comparison system 102 ensures there is at least one benign-transformed and one manipulated versions for any given image I in a mini batch.

Although the 256-D embedding z is already compact, it can still be difficult to scale search to millions of images while retaining interactive speed. Thus, in one or more implementations, the image comparison system 102 binarize the embedding features via a 2-step quantization:

$$b = q_1(z) + q_2(z - q_1(z)) \in \{0,1\}^D$$

where q1(.) is a coarse quantizer to allocate the feature z into one of several clusters, and q2(.) is a fine quantizer encoding the residual of z and its corresponding centroid. q1(.) behaves like an inverted list enabling search within a fraction of the database, while q2(.) delivers a compact binary code efficient for search in the Hamming space. In one or more implementations, the image comparison system 102 uses KMeans with 1024 clusters for q1(.) also extending the search to nearby 10 clusters, and Product Quantization for q2(.) resulting in total a 128-bit descriptor.

As mentioned above, in one or more embodiments, the image comparison system 102 also implements a hashing term with the contrastive loss for generative accurate binary hashes. For example, the image comparison system 102 can generate a feature vector (e.g., the embedding discussed above). In particular, the image comparison system 102 can map the digital image to a feature vector utilizing the image retrieval model. The image comparison system 102 can utilize a hashing model (e.g., sign hashing function) to generate a visual hash from the feature vector. The image comparison system 102 can then compare the visual hash and the feature vector to generate the hashing term. Accordingly, the image comparison system 102 modifies parameters of the deep visual search embedding model based on the hashing term and the contrastive loss (e.g., via back-propagation).

In one or more embodiments, the image comparison system 102 approximates the expectations using mini-batches and applies the hashing term on the same examples as the main contrastive loss. Similarly, in some embodiments, the image comparison system 102 does not use projection layers on top of the target embeddings as they may harm the image retrieval performance.

In addition, a number of embodiments utilize a variety of implementation differences relative to other self-supervised learning approaches, including the presence of the hashing term, set of augmentations used (e.g., avoiding large random cropping so that the content of an image is preserved), hyperparameters (e.g., no projection layers, shorter training), and final metric for model selection (image retrieval performance vs transfer learning).

Manipulation may introduce substantial change in an image. For a corpus of millions of images, a near-duplicate search model may not always retrieve the correct original image as the top ranked (top-1) result. Therefore, in one or more implementations, the image comparison system 102 applies a re-ranking to the top-k candidate images obtained from the initial (stage 1) near-duplicate retrieval search. Typical visual search pipelines apply second stage (stage 2) processing via geometric verification (GV) to discard false positives within the top-k results (stage 2). This process is slow (typically up to one second per image doing GV via MLESAC). For interactive search speeds, choice of a low k is therefore forced. Instead, in one or more implementations, the image comparison system 102 uses the deep image comparator model classifier for second stage processing. In particular, the image comparison system 102 re-ranks the top-k results based on the probability of the image pair being distinct. Inference takes around 4 ms per pair, enabling larger k.

As mentioned above, the researchers have conducted a variety of experiments that establish improvements of example implementations of the image comparison system 102 relative to conventional systems. To evaluate near duplicate search, researchers used Instance Retrieval IR@k metric which measures the ratio of queries that returns the relevant images within top-k retrieval. To evaluate the deep image comparator model 106, researched uses Average Precision (AP) to measure the accuracy of the classifier of the deep image comparator model 106. To evaluate the generated heatmap, researchers upsampled the 7×7 heatmap to the image resolution H×W, converted to binary with a threshold and computed Intersection over Union (IoU) with the ground truth.

Figure 6:
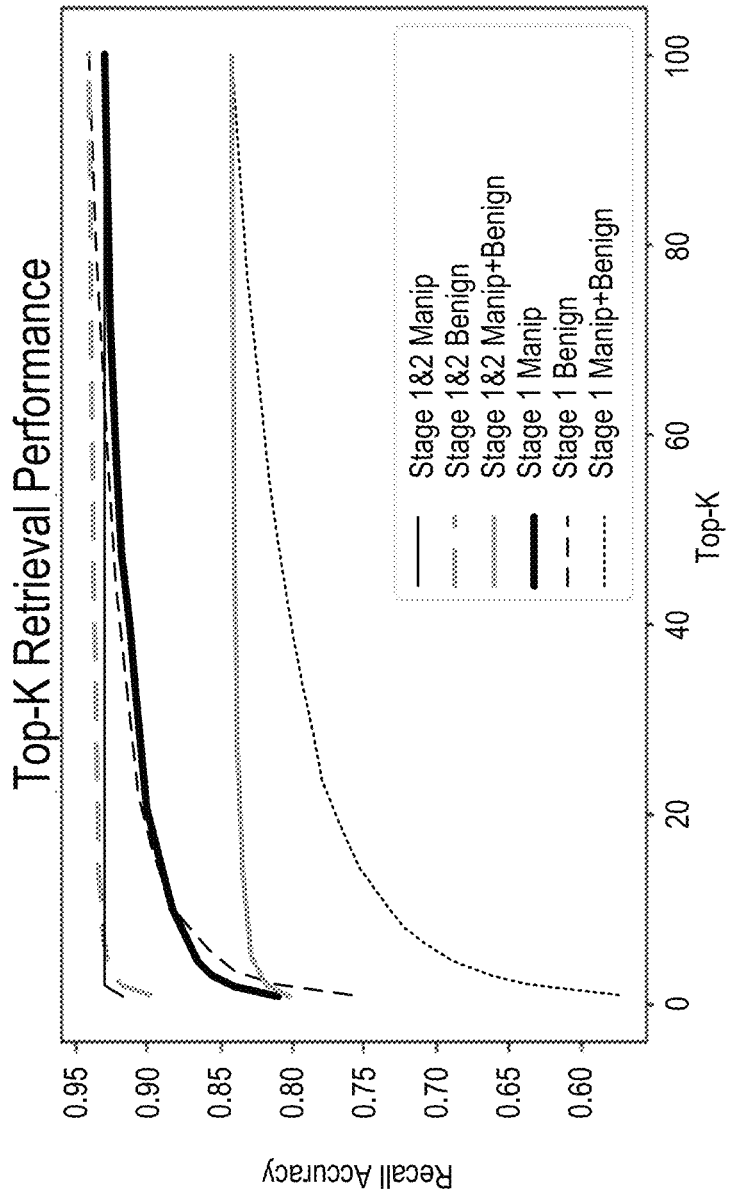
FIG. 6 illustrates a graph showing the recall accuracy of the image retrieval model in accordance with one or more embodiments.

Specifically, researchers compared the near duplicate search performed by the image retrieval model 408 against eight baselines as shown in FIG. 5. As shown, the near duplicate search performed by the image retrieval model 408 outperforms the other models for benign modifications, editorial manipulations plus benign modifications, and on average. Furthermore, the advantage of deep image comparator model 106 is shown in FIG. 6 where the two-stage retrieval reaches its upper bound performance within top-10 returned images across the 3 query sets. The curve justifies a top-k shortlist of k=100; at this level the end-to-end deep image comparator model 106 retains interactive speeds (stage 1: 40 ms, stage 2: 400 ms) on a GTX 1080 Ti GPU.

Figure 7:
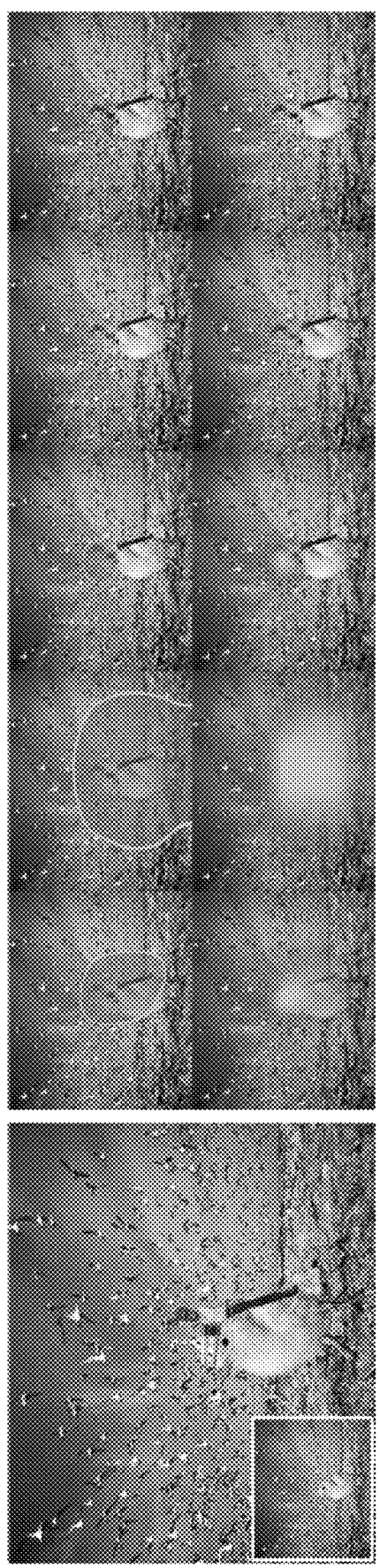
FIG. 7 illustrates a comparison of visual localizations of editorial manipulations generated by the deep image comparator model in comparison to state-of-the art baseline models in accordance with one or more embodiments.
Figure 8:
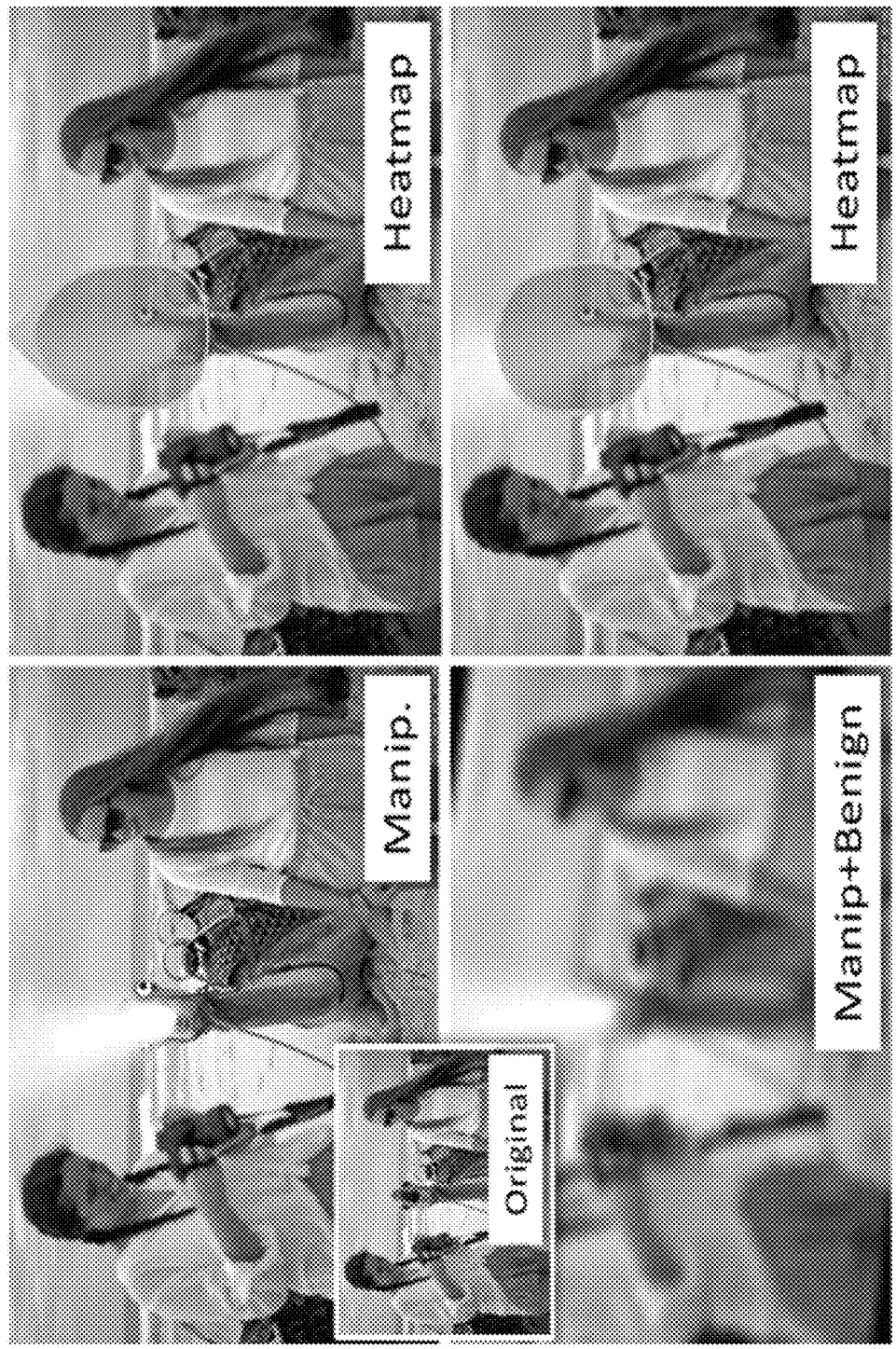
FIG. 8 illustrates a comparison of visual localizations of editorial manipulations generated by the deep image comparator model for an image subjected to editorial manipulations alone and to the image subjected to both editorial changes and benign manipulations in accordance with one or more embodiments.

FIG. 7 is a comparison of heatmap visualizations (in green) from the deep image comparator model 106, and baseline methods for thresholded (top) and non-thresholded (bot.) heatmaps. The heatmap visualizes manipulation of an image (crown/rider added on bird). As shown, the deep image comparator model 106 provides more accurate heat maps. Relatedly, FIG. 8 shows heatmaps showing manipulation of an original image (inset) at threshold 0.35. The region of manipulation is correctly identified both without (top) and with (bottom) benign transformation of the manipulated version.

FIG. 9 (first column) reports the IoU metric between the predicted heatmap and the ground truth, both with and without the thresholding. Whilst most baselines are improved through use of the geometric alignment (FA) process, the deep image comparator model 106 significantly exceeds baseline performances by at least 0.30.

FIG. 10 illustrates the results of an ablation study. As shown both detection and localization performance are significantly dependent on $F_A$ (the geometric alignment model), dropping by 13% and 0.22, respectively when it is omitted. In the 'no $F_P$' experiment (i.e., no prediction model), the prediction module $F_P$ is replaced by a ResNet50 architecture fR(.), and z=fR(q')−fR(I). Training with either $F_P$ or $F_A$ frozen also reduces both detection and localization performances. Finally, the deep image comparator model 106 was trained using just one of the two losses by changing the weights of total loss L(.)=wcLC(.)+wtLT(.) from wc=wt=0.5 to wc=1, wt=0 and wc=0, wt=1. While LC(.) alone still yields good detection performance with AP of 95.5%, localization IoU suffers significantly; both tasks are required to train the ICN.

Figure 11:
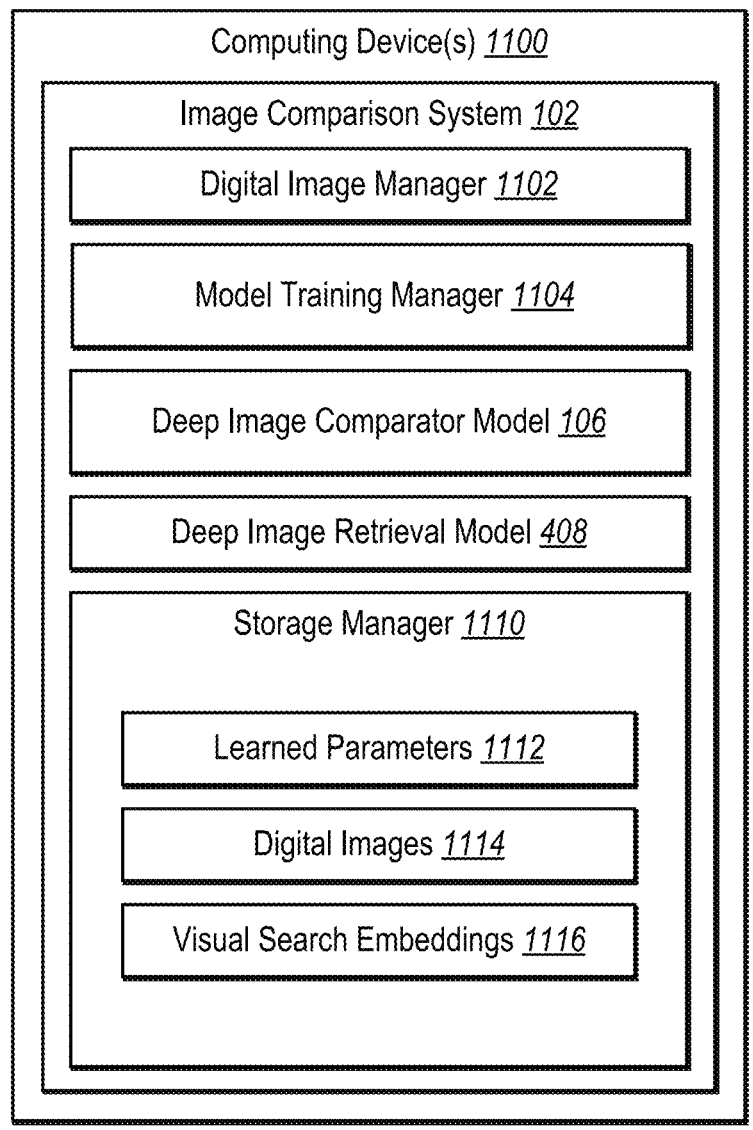
FIG. 11 illustrates a schematic diagram of an image comparison system in accordance with one or more embodiments.

Looking now to FIG. 11, additional detail will be provided regarding components and capabilities of the image comparison system 102. Specifically, FIG. 11 illustrates an example schematic diagram of the image comparison system 102 on an example computing device 1100 (e.g., one or more of the client device 112 and/or the server(s) 104). As shown in FIG. 11, the image comparison system 102 includes a digital image manager 1102, a model training manager 1104, a deep image comparator model 106, a deep image retrieval model 408, and a storage manager 1110.

As just mentioned, the image comparison system 102 includes the digital image manager 1102. The digital image manager 1102 can collect, identify, retrieve, and/or modify digital images. For example, the digital image manager 1102 can collect digital images and monitor interactions, modifications and/or revisions corresponding to a digital image.

As shown in FIG. 11, the image comparison system 102 also includes the model training manager 1104. The model training manager 1104 can train, learn, and/or generate parameters of the deep image comparator model 106 and/or the deep image retrieval model 408. As discussed above, the model training manager 1104 can train a deep image retrieval model and a hashing model. For example, the model training manager 1104 can utilize robust contrastive learning to learn parameters of the deep image retrieval model 408. Similarly, the model training manager 1104 can utilize a 3-way cross entropy loss and a cosine distance loss to learn parameters of the deep image comparator model 106.

As further illustrated in FIG. 11, the image comparison system 102 also includes the deep image comparator model 106. Moreover, as shown, the image comparison system 102 can include the deep image retrieval model 408.

In addition, as illustrated in FIG. 11, the image comparison system 102 can also include the storage manager 1110. The storage manager 1110 can include one or more memory devices for storing information related to the image comparison system 102. For instance, as shown, the storage manager 1110 can store, recall, and/or maintain learned parameters 1112 (e.g., learned parameters of a deep image comparator or retrieval models), digital images 1114 (e.g., trusted or training digital images), visual search embeddings 1116 (and optionally hashes of the visual search embeddings 1116).

In one or more embodiments, each of the components of the image comparison system 102 are in communication with one another using any suitable communication technologies. Additionally, the components of the image comparison system 102 are in communication with one or more other devices including one or more client devices described above. It will be recognized that although the components of the image comparison system 102 are shown to be separate in FIG. 11, any of the subcomponents may be combined into fewer components, such as into a single component, or divided into more components as may serve a particular implementation. Furthermore, although the components of FIG. 11 are described in connection with the image comparison system 102, at least some of the components for performing operations in conjunction with the image comparison system 102 described herein may be implemented on other devices within the environment.

The components of the image comparison system 102 can include software, hardware, or both. For example, the components of the image comparison system 102 can include one or more instructions stored on a computer-readable storage medium and executable by processors (or at least one processor) of one or more computing devices (e.g., the computing device 1100). When executed by the one or more processors, the computer-executable instructions of the image comparison system 102 can cause the computing device 1100 to perform the methods described herein. Alternatively, the components of the image comparison system 102 can comprise hardware, such as a special purpose processing device to perform a certain function or group of functions. Additionally, or alternatively, the components of the image comparison system 102 can include a combination of computer-executable instructions and hardware.

Furthermore, the components of the image comparison system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the image comparison system 102 may be implemented as part of a stand-alone application on a personal computing device or a mobile device. Alternatively, or additionally, the components of the image comparison system 102 may be implemented in any application for displaying, modifying, or identifying digital content, including, but not limited to ADOBE CREATIVE CLOUD, LIGHTROOM, BEHANCE, PHOTOSHOP, and ADOBE STOCK. The foregoing are either registered trademarks or trademarks of Adobe Inc. in the United States and/or other countries.

Figure 12:
FIG. 12 illustrates a flowchart of a series of acts for utilizing a deep image comparator model to visual localizations of editorial image manipulations in accordance with one or more embodiments.

FIGS. 1-11 the corresponding text, and the examples provide a number of different systems, methods, and non-transitory computer readable media for generating visual indicators identifying locations of editorial modifications in an image and classifying images as including benign modifications, editorial modifications, or being a different image. In addition to the foregoing, embodiments can also be described in terms of flowcharts comprising acts for accomplishing a particular result. For example, FIG. 12 illustrates a flowchart of an example sequence or series of acts for utilizing a deep image comparator model to generate visual indicators identifying locations of editorial modifications in an image in accordance with one or more embodiments. Similarly, FIG. 13 illustrates a flowchart of an example sequence or series of acts for classifying images as including benign modifications or editorial modifications utilizing a deep image retrieval model in accordance with one or more embodiments.

While FIGS. 12-13 illustrates acts according to particular embodiments, alternative embodiments may omit, add to, reorder, and/or modify any of the acts shown in FIGS. 12-13. The acts of FIGS. 12-13 can be performed as part of a method. Alternatively, a non-transitory computer readable medium can comprise instructions, that when executed by one or more processors, cause a computing device to perform the acts of FIGS. 12-13. In still further embodiments, a system can perform the acts of FIG. 12-13. Additionally, the acts described herein may be repeated or performed in parallel with one another or in parallel with different instances of the same or other similar acts.

FIG. 12 illustrates an example series of acts 1200 for utilizing a deep image comparator model to generate visual indicators identifying locations of editorial modifications in an image in accordance with one or more embodiments. In particular, the series of acts 1200 includes an act 1210 of aligning a first image with a second image to generate an aligned first image. Specifically, the act 1210 can include generating an optical flow between the first image and the second image. Act 1210 can further involve warping the first image utilizing a de-warping unit based on the optical flow to generate the aligned first image.

As illustrated, the series of acts 1200 can also include an act 1220 of generating a fused feature vector by combining deep features from the aligned first image and the second image. In particular the act 1220 can include generating a first set of deep features for the aligned first image utilizing a neural network feature extractor. Additionally, the act 1220 can also include generating a second set of deep features for the second image utilizing the neural network feature extractor. Act 1220 can involve generating a combination of the first set of deep features and the second set of deep features. Act 1220 can involve generating the fused feature vector from the combination utilizing a neural network encoder.

Moreover, as shown in FIG. 12, the series of acts 1200 can include the act 1230 of generating one or more visual indicators from the fused feature vector utilizing one or more neural network layers. The one or more visual indicators identify locations of editorial modifications in the first image relative to the second image. For example, the act 1230 can include generating a heat map from the fused feature vector utilizing a multilayer perceptron. Moreover, the act 1230 can include overlaying the one or more visual indicators on the first image based on the heat map.

In some embodiments, the series of acts 1200 may include generating a classification for modifications of the first image relative to the second image as benign, editorial, or a different image. In particular, the series of acts 1200 can include generating a probability that the first image has benign changes, generating a probability that the first image has editorial changes, and generating a probability that the first image is a different image from the second image. In one or more implementations, acts 1200 can involve generating the classification from the fused feature vector utilizing one or more additional neural network layers.

FIG. 13 illustrates an examples series of acts 1300 for determining a classification of changes made to a digital image. As shown, the series of acts 1300 includes an act 1310 of searching a set of trusted digital images for a trusted near-duplicate image to a query image. In particular, the act 1310 can include generating visual search embeddings for the images of the set of trusted digital image and the query image utilizing an image retrieval model. Act 1310 can also include learning the parameters of the image retrieval model utilizing a contrastive loss. Act 1310 can further involve generating the visual search embeddings by encoding the images of the set of trusted digital images and the query image utilizing a convolutional neural network that is robust to benign image transformations. Act 1310 can also involve generating binary hashes of the visual search embeddings. Furthermore, act 1310 can involve comparing a binary hash of the visual search embedding for the query image with binary hashes of visual search embeddings for the images of the set of trusted digital images.

The series of acts 1300 can also include an act 1320 of aligning the query image to the trusted near-duplicate image to generate an aligned query image. For instance, the act 1320 can include generating an optical flow between the query image and the trusted near-duplicate image utilizing an optical flow estimator. Act 1320 can also involve warping the query image utilizing a de-warping unit based on the optical flow to generate the aligned query image.

The series of acts 1300 can also include an act 1330 of generating a fused feature vector by combining deep features from the aligned query image and the trusted near-duplicate image. In particular, the act 1330 can include generating a first set of deep features for the aligned query image utilizing a neural network feature extractor. Act 1330 can also involve generating a second set of deep features for the trusted near-duplicate image utilizing the neural network feature extractor. Act 1330 can further involve generating a combination of the first set of deep features and the second set of deep features. Additionally, act 1330 can involve generating the fused feature vector from the combination utilizing a neural network encoder.

The series of acts 1300 can also an act 1340 of determining whether changes to the query image relative to the trusted near-duplicate image comprise benign changes or editorial changes. For example, act 1340 can involve generating a classification from the fused feature vector utilizing one or more neural network layers. Act 1340 can also involve determining a probability that the query image has benign changes and determining a probability that the query image has editorial changes. In one or more further implementations, act 1340 involves determining a probability that query image is a different image from the trusted near-duplicate image.

Moreover, the series of acts 1300 can include generating one or more visual indicators from the fused feature vector utilizing one or more additional neural network layers. The one or more visual indicators identify locations of editorial modifications in the query image relative to the trusted near-duplicate image. The series of acts 1300 can also include generating the one or more visual indicators by generating a heat map from the fused feature vector utilizing a multilayer perceptron and overlaying the one or more visual indicators on the query image based on the heat map.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
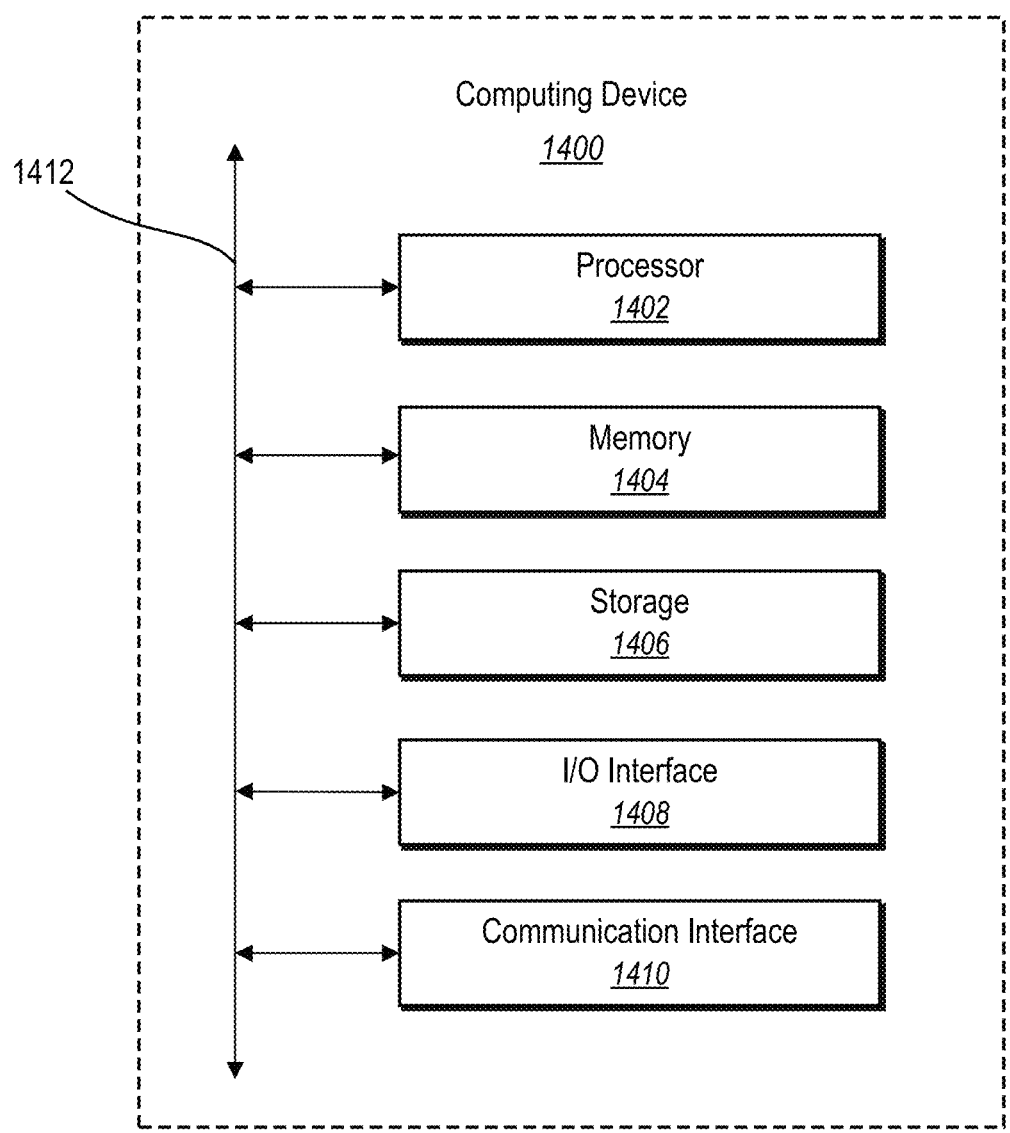
FIG. 14 illustrates a block diagram of an example computing device in accordance with one or more embodiments.

FIG. 14 illustrates, in block diagram form, an example computing device 1400 (e.g., the computing device 1100, the client device 112, and/or the server(s) 104) that may be configured to perform one or more of the processes described above. One will appreciate that the image comparison system 102 can comprise implementations of the computing device 1400. As shown by FIG. 14, the computing device can comprise a processor 1402, memory 1404, a storage device 1406, an I/O interface 1408, and a communication interface 1410. Furthermore, the computing device 1400 can include an input device such as a touchscreen, mouse, keyboard, etc. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a writing device or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause the at least one processor to perform operations comprising:

aligning a first image with a second image to generate an aligned first image;

generating a fused feature vector by combining deep features from the aligned first image and the second image;

generating a classification for modifications of the first image relative to the second image as benign, editorial, or a different image; and generating one or more visual indicators, from the fused feature vector utilizing one or more neural network layers, identifying locations of editorial modifications in the first image relative to the second image.

2. The non-transitory computer readable medium of claim 1, wherein aligning the first image with the second image comprises:

generating an optical flow between the first image and the second image; and warping the first image utilizing a de-warping unit based on the optical flow to generate the aligned first image.

3. The non-transitory computer readable medium of claim 1, wherein the operations further comprise:

generating a first set of deep features for the aligned first image utilizing a neural network feature extractor; and generating a second set of deep features for the second image utilizing the neural network feature extractor.

4. The non-transitory computer readable medium of claim 3, wherein generating the fused feature vector by combining deep features from the aligned first image and the second image comprises:

generating a combination of the first set of deep features and the second set of deep features; and generating the fused feature vector from the combination utilizing a neural network encoder.

5. The non-transitory computer readable medium of claim 1, wherein generating the one or more visual indicators, from the fused feature vector utilizing the one or more neural network layers, identifying locations of editorial modifications in the first image relative to the second image comprises:

generating a heat map from the fused feature vector utilizing a multilayer perceptron; and overlaying the one or more visual indicators on the first image based on the heat map.

6. The non-transitory computer readable medium of claim 1, wherein operations further comprise generating a database of trusted digital images, wherein the second image is a trusted digital image from the database of trusted digital images.

7. The non-transitory computer readable medium of claim 1, wherein generating the classification for the modifications of the first image comprises determining:

a probability that the first image has benign changes;

a probability that the first image has editorial changes; and a probability that the first image is a different image from the second image.

8. The non-transitory computer readable medium of claim 1, wherein generating the classification for the modifications of the first image comprises generating the classification from the fused feature vector utilizing one or more additional neural network layers.

9. A system comprising:

one or more memory devices comprising a set of trusted digital images; and one or more processors that are configured to cause the system to:

search the set of trusted digital images for a trusted near-duplicate image to a query image;

align the query image to the trusted near-duplicate image to generate an aligned query image;

generating a fused feature vector by combining deep features from the aligned query image and the trusted near-duplicate image; and determine whether changes to the query image relative to the trusted near-duplicate image comprise benign changes or editorial changes by generating a classification from the fused feature vector utilizing one or more neural network layers.

10. The system of claim 9, wherein the one or more processors are further configured to cause the system to generate visual search embeddings for images of the set of trusted digital images and the query image utilizing an image retrieval model.

11. The system of claim 10, wherein the one or more processors are further configured to cause the system to learn parameters of the image retrieval model utilizing a contrastive loss.

12. The system of claim 10, wherein the one or more processors are further configured to cause the system to generate the visual search embeddings by encoding the images of the set of trusted digital images and the query image utilizing a convolutional neural network that is robust to benign image transformations.

13. The system of claim 10, wherein the one or more processors are further configured to cause the system to generate binary hashes of the visual search embeddings.

14. The system of claim 13, wherein the one or more processors are configured to cause the system to search the set of trusted digital images for the trusted near-duplicate image to the query image by comparing a binary hash of a visual search embedding for the query image with binary hashes of visual search embeddings for the images of the set of trusted digital images.

15. The system of claim 9, wherein the one or more processors are further configured to cause the system to generate one or more visual indicators from the fused feature vector utilizing one or more additional neural network layers, the one or more visual indicators identifying locations of editorial modifications in the query image relative to the trusted near-duplicate image.

16. The system of claim 15, wherein the one or more processors are configured to cause the system to generate the one or more visual indicators by:

generating a heat map from the fused feature vector utilizing a multilayer perceptron; and overlaying the one or more visual indicators on the query image based on the heat map.

17. The system of claim 9, wherein the one or more processors are configured to cause the system to align the query image with the trusted near-duplicate image by:

generating an optical flow between the query image and the trusted near-duplicate image utilizing an optical flow estimator; and warping the query image utilizing a de-warping unit based on the optical flow to generate the aligned query image.

18. A computer-implemented method comprising:

aligning a first image with a second image to generate an aligned first image based on an optical flow between the first image and the second image;

generating a first set of deep features for the aligned first image and a second set of deep features for the second image utilizing a neural network feature extractor;

generating a fused feature vector by combining the first set of deep features and second set of deep features;

generating a classification for modifications of the first image relative to the second image as benign, editorial, or a different image; and generating one or more visual indicators from the fused feature vector utilizing one or more neural network layers, the one or more visual indicators identifying locations of editorial modifications in the first image relative to the second image.

19. The computer-implemented method of claim 18, wherein generating the one or more visual indicators comprises:
generating a heat map from the fused feature vector utilizing a multilayer perceptron; and
overlaying the one or more visual indicators on the first image based on the heat map.

20. The computer-implemented method of claim 18, wherein generating a fused feature vector by combining the first set of deep features and second set of deep features comprises passing a combination of the first set of deep features and second set of deep features through a neural network encoder.

* * * * *